US012726380B2

(12) United States Patent
Zou et al.

(10) Patent No.: US 12,726,380 B2
(45) Date of Patent: Sep. 1, 2026

(54) CROSS-NETWORK-SEGMENT DISCOVERY METHOD AND SYSTEM, AND ROUTING DEVICE

(71) Applicant: HUAWEI TECHNOLOGIES CO., LTD., Shenzhen (CN)

(72) Inventors: Hongbin Zou, Xi'an (CN); Ming Kuang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 18/259,707

(22) PCT Filed: Dec. 22, 2021

(86) PCT No.: PCT/CN2021/140461

§ 371 (c)(1),
(2) Date: Aug. 19, 2024

(87) PCT Pub. No.: WO2022/143339

PCT Pub. Date: Jul. 7, 2022

(65) Prior Publication Data

US 2024/0406023 A1 Dec. 5, 2024

(30) Foreign Application Priority Data

Dec. 31, 2020 (CN) ......................... 202011634247.0

(51) Int. Cl.
*H04L 12/28* (2006.01)
*H04L 41/12* (2022.01)

(52) U.S. Cl.
CPC .......... *H04L 12/2803* (2013.01); *H04L 41/12* (2013.01)

(58) Field of Classification Search
CPC ............................ H04L 12/2803; H04L 41/12
See application file for complete search history.

(56) References Cited

U.S. PATENT DOCUMENTS 10,630,543 B1 * 4/2020 Wei ......................... H04W 4/70
11,037,422 B1 * 6/2021 Solomon ............ G08B 13/2431
(Continued)

FOREIGN PATENT DOCUMENTS

CN 103095749 A 5/2013
CN 110830841 A 2/2020
JP 2012113659 A 6/2012

OTHER PUBLICATIONS

Anonymous:"UPnP Proxy", Nov. 12, 2020 (Nov. 12, 2020),XP093132665,Retrieved from the Internet:URL:https://web.archive.org/web/20201112020151/http://www.nongnu.org/upnpproxy/,total 3 pages.

*Primary Examiner* — Mohamed A. Wasel

(57) ABSTRACT

A cross-network-segment discovery method includes: an electronic device A sends, to an electronic device B, a DLNA delivery message including a URL and an identifier of the electronic device B. The electronic device B plays content corresponding to the URL. After the electronic device A moves from an area A to an area B, the electronic device A disconnects from a routing device A and connects to a routing device B. The electronic device A sends, to the routing device B, a first request message including a fixed multicast address. The routing device B forwards the first request message to the routing device A. The routing device A sends the first request message in a multicast mode within a range of a first multicast address. The electronic device B sends a first response message to the electronic device A by the routing device A and the routing device B.

11 Claims, 13 Drawing Sheets

(56) References Cited

U.S. PATENT DOCUMENTS

| | | | | |
|---|---|---|---|---|
| 2003/0063608 | A1 | 4/2003 | Moonen | |
| 2004/0249923 | A1* | 12/2004 | Ko | H04L 12/2803 709/223 |
| 2017/0245133 | A1* | 8/2017 | Fontaine | H04L 12/283 |
| 2019/0268177 | A1* | 8/2019 | Li | H04L 12/2834 |
| 2021/0203524 | A1* | 7/2021 | Strater | H04W 92/20 |
| 2021/0203527 | A1* | 7/2021 | Strater | H04W 24/02 |

* cited by examiner

CROSS-NETWORK-SEGMENT DISCOVERY METHOD AND SYSTEM, AND ROUTING DEVICE

CROSS-REFERENCE TO RELATED APPLICATIONS

This application is a National Stage of International Application No. PCT/CN2021/140461 filed on Dec. 22, 2021, which claims priority to Chinese Patent Application No. 202011634247.0 filed on Dec. 31, 2020. Both of the aforementioned applications are hereby incorporated by reference in their entireties.

TECHNICAL FIELD

This disclosure relates to the field of terminal technologies, and in particular, to a cross-network-segment discovery method and system, and a routing device.

BACKGROUND

The digital living network alliance (DLNA) has developed a guideline and specification for a media format, transmission, and a protocol interoperability based on an open industry standard, aiming to implement the interconnection between a wireless network and a wired network, including a personal computer, a consumer appliance, and a mobile device. As a solution for multi-device interconnection, DLNA has been widely used in scenarios such as wireless projection between a mobile phone and a large screen and lossless delivery of third-party music resources to a smart speaker. The DLNA uses the universal plug and play (UPnP) protocol family as a basic protocol framework. A goal of the UPnP is that in this protocol framework, as soon as a device connects to a network, another device in the network can immediately discover that the new device is added to the network; and devices in the network can communicate with each other, directly use or control each other, do not need to set any parameter in advance, and completely plug and play.

In an application scenario in which a plurality of routing devices are used for networking, different routing devices are generally placed in different areas because a coverage capability of a routing device is limited. For example, a routing device A is placed in an area A, and a routing device B is placed in an area B. The routing device A and the routing device B are networked. An electronic device in the area A connects to the routing device A, and an electronic device in the area B connects to the routing device B. A mobile device A0 of which a DLNA function is enabled and a smart speaker A1 of which a DLNA function is enabled are used as an example. The mobile device A0 and the smart speaker A1 in the area A automatically discover each other, and the smart speaker A1 is controlled by the mobile device A0. After the mobile device A0 moves from the area A to the area B, although the mobile device A0 can automatically connect to the routing device B, the mobile device A0 cannot automatically discover the smart speaker A1, and the smart speaker A1 cannot automatically discover the mobile device A0. The routing device A and the routing device B may be parent-child routers. The routing device A may also be a router, and the routing device B is a wireless fidelity (Wi-Fi) amplifier. This brings inconvenience to a user, and user experience is poor.

SUMMARY

Through in-depth research and analysis, an inventor concludes that: UpnP implements a discovery function of a device in a network according to a simple service discovery protocol (SSDP), and implements a control function of the device in the network according to a simple object access protocol (SOAP). In the SSDP, the device is discovered in a multicast mode. Although a routing device can forward data packets in the multicast mode, to avoid a network storm and network congestion caused by multicast forwarding, routing devices generally do not forward the data packets in the multicast mode between each other. In this way, after a same electronic device moves from the foregoing area A to the foregoing area B, because a routing device A and a routing device B are located on different network segments, and no data packet in the multicast mode is forwarded between the routing device A and the routing device B, in an SSDP-based network environment, devices located on a same network segment can discover each other, and devices located on different network segments cannot discover each other.

To resolve the foregoing technical problem, this application provides a cross-network-segment discovery method and system, and a routing device, so that a device can be automatically discovered across network segments, to improve user convenience and improve user experience.

According to a first aspect, this application provides a cross-network-segment discovery method. The method includes: A first electronic device and a second electronic device separately connect to a first routing device. The first electronic device requests to perform DLNA delivery to the second electronic device. The second electronic device plays DLNA delivery content in response to receiving a first operation of a user on the second electronic device. The first electronic device disconnects from a first routing device, and connects to a second routing device. The first electronic device sends a first request message to a first multicast address in a multicast mode. The second routing device forwards, to the first routing device, the first request message obtained through listening. The first routing device forwards the first request message in the multicast mode within a range of the first multicast address. The first operation is used to confirm that the first electronic device performs DLNA delivery to the second electronic device. The first request message is used to request to discover the second electronic device. In response to listening to the first request message, the second electronic device sends a first response message to the first electronic device through the first routing device and the second routing device. The first response message is used to discover the second electronic device. The first electronic device discovers the second electronic device in response to listening to the first response message.

In the method, when the first electronic device and the second electronic device are located on a same local area network segment (both connect to the first routing device), the first electronic device performs DLNA delivery to the second electronic device for at least one time, and performs DLNA delivery security confirmation when DLNA delivery is performed. The routing device allows multicast forwarding of an electronic device on which security confirmation is performed. In this way, after connecting to another routing device, the first electronic device may also discover and use the second electronic device, to avoid a problem that the second electronic device cannot be discovered and controlled in some areas by using the first electronic device. This improves user experience.

According to the first aspect, that the second routing device forwards, to the first routing device, the first request message obtained through listening includes: The second routing device determines that the second electronic device receives the first operation, and forwards, to the first routing device, the first request message obtained through listening.

In other words, the routing device forwards only a discovery request of an electronic device on which security confirmation is performed.

According to any one of the first aspect or the implementations of the first aspect, the method further includes: The second electronic device sends an identifier of the first electronic device to the first routing device in response to receiving the first operation of the user on the second electronic device. The first routing device sends the identifier of the first electronic device to the second routing device. The first routing device and the second routing device separately store the identifier of the first electronic device. That the second routing device determines that the second electronic device receives the first operation includes: The second routing device determines that the identifier of the first electronic device is stored.

According to any one of the first aspect or the implementations of the first aspect, the method further includes: The second electronic device sends a first message to the first multicast address in the multicast mode. The first message is used to discover the second electronic device. The first routing device forwards, to the second routing device, the first message obtained through listening. The second routing device forwards the first message in the multicast mode within the range of the first multicast address. The first electronic device discovers the second electronic device in response to listening to the first message.

In the method, the routing device allows multicast forwarding of the first electronic device and the second electronic device in the local area network. In this way, the first electronic device and the second electronic device may discover each other.

According to any one of the first aspect or the implementations of the first aspect, that the first routing device forwards, to the second routing device, the first message obtained through listening includes: The first routing device determines that the second electronic device receives the first operation, and forwards, to the second routing device, the first message obtained through listening. That is, if the routing device determines that the user confirms DLNA delivery by the first electronic device to the second electronic device, the routing device allows multicast forwarding of the first electronic device and the second electronic device in the local area network.

According to any one of the first aspect or the implementations of the first aspect, the method further includes: The second electronic device sends an identifier of the second electronic device to the first routing device in response to receiving the first operation of the user on the second electronic device. The first routing device sends the identifier of the second electronic device to the second routing device. The first routing device and the second routing device separately store the identifier of the second electronic device. That the first routing device determines that the second electronic device receives the first operation includes: The first routing device determines that the identifier of the second electronic device is stored.

According to a second aspect, this application provides a cross-network-segment discovery method. The method includes: An electronic device connects to a first routing device. The electronic device receives a request for performing DLNA delivery by a first electronic device that connects to the first routing device. The electronic device plays DLNA delivery content in response to receiving a first operation of a user on the electronic device. The first operation is used to confirm that the first electronic device performs DLNA delivery to the electronic device.

In the method, the user needs to perform DLNA delivery security confirmation on the electronic device, so that the electronic device plays the DLNA delivery content. In this way, the routing device may determine an electronic device on which the DLNA delivery security confirmation is performed, and allow multicast forwarding of the electronic device on which the security confirmation is performed. When the first electronic device and the second electronic device are located on different network segments, the first electronic device and the second electronic device may also discover each other.

According to the second aspect, the method further includes: The electronic device sends an identifier of the first electronic device and an identifier of the electronic device to the first routing device in response to receiving the first operation of the user on the electronic device.

According to any one of the second aspect or the implementations of the second aspect, after the electronic device receives a request for performing the DLNA delivery by the first electronic device, the method further includes: The electronic device sends first prompt information. The first prompt information prompts the user to perform the first operation on the electronic device.

According to a third aspect, an electronic device is provided. The electronic device includes: one or more processors; a memory; and one or more computer programs. The one or more computer programs are stored in the memory. When the computer programs are executed by the one or more processors, the electronic device performs the following operations: connecting to a first routing device; receiving a request for performing DLNA delivery by a first electronic device that connects to the first routing device; and playing DLNA delivery content in response to receiving a first operation of a user on an electronic device. The first operation is used to confirm that the first electronic device performs DLNA delivery to the electronic device.

According to the third aspect, when the computer programs are executed by the one or more processors, the electronic device is further enabled to perform the following operation: sending an identifier of the first electronic device and an identifier of the electronic device to the first routing device in response to receiving the first operation of the user on the electronic device.

According to any one of the third aspect or the implementations of the third aspect, when the computer programs are executed by the one or more processors, the electronic device is further enabled to perform the following operation: sending first prompt information after receiving a request for performing DLNA delivery by the first electronic device. The first prompt information prompts the user to perform the first operation on the electronic device.

Any one of the third aspect and the implementations of the third aspect are respectively corresponding to any one of the second aspect and the implementations of the second aspect. For technical effects corresponding to any one of the third aspect and the implementations of the third aspect, refer to technical effects corresponding to any one of the second aspect and the implementations of the second aspect. Details are not described herein again.

According to a fourth aspect, this application provides a cross-network-segment discovery method. The method includes: A first routing device receives first indication information. The first indication information indicates that a second electronic device that connects to the first routing device has received a first operation of a user on the second electronic device, and the first operation is used to confirm that a first electronic device performs DLNA delivery to the second electronic device. The first routing device receives, from a second routing device, a first request message sent by the first electronic device to a first multicast address in a multicast mode. The first request message is used to request to discover the second electronic device. The first routing device forwards the first request message in the multicast mode within a range of the first multicast address.

In the method, a routing device allows multicast forwarding of an electronic device on which security confirmation is performed. In this way, when the first electronic device and the second electronic device are located on different network segments, the first electronic device and the second electronic device may also discover each other.

According to the fourth aspect, the method further includes: The first routing device listens to a first message sent by the second electronic device to the first multicast address in the multicast mode, and forwards the first message to the second routing device. The first message is used to discover the second electronic device. In the method, a routing device allows multicast forwarding of an electronic device on which security confirmation is performed.

According to any one of the fourth aspect or the implementations of the fourth aspect, the first indication information includes at least one of the following: an identifier of the first electronic device, and an identifier of the second electronic device.

According to a fifth aspect, a routing device is provided. The routing device includes: one or more processors; a memory; and one or more computer programs. The one or more computer programs are stored in the memory. When the computer programs are executed by the one or more processors, the routing device performs the following operations: receiving first indication information, where the first indication information indicates that a second electronic device that connects to the routing device has received a first operation of a user on the second electronic device, and the first operation is used to confirm that a first electronic device performs DLNA delivery to the second electronic device; receiving, from a second routing device, a first request message sent by the first electronic device to a first multicast address in a multicast mode, where the first request message is used to request to discover the second electronic device; and forwarding the first request message in the multicast mode within a range of the first multicast address.

According to the fifth aspect, when the computer programs are executed by the one or more processors, the routing device is further enabled to perform the following operations: listening to a first message sent by the second electronic device to the first multicast address in the multicast mode, and forwarding the first message to the second routing device. The first message is used to discover the second electronic device.

According to any one of the fifth aspect or the implementations of the fifth aspect, the first indication information includes at least one of the following: an identifier of the first electronic device, and an identifier of the second electronic device.

Any one of the fifth aspect and the implementations of the fifth aspect are respectively corresponding to any one of the fourth aspect and the implementations of the fourth aspect. For technical effects corresponding to any one of the fifth aspect and the implementations of the fifth aspect, refer to technical effects corresponding to any one of the fourth aspect and the implementations of the fourth aspect. Details are not described herein again.

According to a sixth aspect, this application provides a system. The system includes the electronic device according to any one of the third aspect or the implementations of the third aspect, and the routing device according to any one of the fifth aspect and the implementations of the fifth aspect. The system is configured to perform the method according to any one of the first aspect or the implementations of the first aspect.

Any one of the sixth aspect and the implementations of the sixth aspect are respectively corresponding to any one of the first aspect, the third aspect, and the fifth aspect, and the implementations of the first aspect, the third aspect, and the fifth aspect. For technical effects corresponding to any one of the sixth aspect and the implementations of the sixth aspect, refer to technical effects corresponding to any one of the first aspect, the third aspect, the fifth aspect, and the implementations of the first aspect, the third aspect, and the fifth aspect. Details are not described herein again.

According to a seventh aspect, this application provides a computer-readable storage medium. The computer-readable storage medium includes a computer program. When the computer program is run on an electronic device, the electronic device is enabled to perform the method according to any one of the second aspect and the implementations of the second aspect, or the method according to any one of the fourth aspect and the implementations of the fourth aspect.

Any one of the seventh aspect and the implementations of the seventh aspect are respectively corresponding to any one of the second aspect, and the fourth aspect, and the implementations of the second aspect and the fourth aspect. For technical effects corresponding to any one of the seventh aspect and the implementations of the seventh aspect, refer to technical effects corresponding to any one of the second aspect, the fourth aspect, and the implementations of the second aspect and the fourth aspect. Details are not described herein again.

According to an eighth aspect, a computer program product is provided. When the computer program product runs on a computer, the computer is enabled to perform the method according to any one of the second aspect and the implementations of the second aspect, or the method according to any one of the fourth aspect and the implementations of the fourth aspect.

Any one of the eighth aspect and the implementations of the eighth aspect are respectively corresponding to any one of the second aspect, and the fourth aspect, and the implementations of the second aspect and the fourth aspect. For technical effects corresponding to any one of the eighth aspect and the implementations of the eighth aspect, refer to the technical effects corresponding to any one of the second aspect, the fourth aspect, and the implementations of the second aspect and the fourth aspect. Details are not described herein again.

According to a ninth aspect, this application provides a cross-network-segment discovery method. The method is applied to a first routing device, a second routing device, a first electronic device, and a second electronic device. The first routing device, the first electronic device, and the second electronic device are located in a first area. The second routing device is located in a second area. The first electronic device and the second electronic device connect to the first routing device. The first routing device and the second routing device connect to a same local area network. The first routing device and the second routing device provide different network segments (it may be understood that the local area network may include a plurality of routing devices, and the second routing device may be any routing device other than the first routing device). The method includes: The first electronic device sends a digital living network alliance DLNA delivery request message to the second electronic device. The DLNA delivery request message includes at least one URL and an identifier of the second electronic device. The second electronic device displays or plays content corresponding to the URL after receiving the DLNA delivery request message. After the first electronic device moves from the first area to the second area, the first electronic device disconnects from the first routing device, and connects to the second routing device. The first electronic device sends a first request message to the second routing device. The first request message includes a fixed multicast address. The second routing device forwards the first request message to the first routing device after receiving the first request message. The first routing device sends the first request message in a multicast mode within a range of a first multicast address after receiving the first request message. After receiving the first request message, the second electronic device sends a first response message to the first electronic device through the first routing device and the second routing device in sequence. The first response message is received, and the first electronic device discovers the second electronic device.

In the method, when the first electronic device and the second electronic device are located on a same local area network segment (both connect to the first routing device), the first electronic device performs DLNA delivery to the second electronic device for at least one time. The routing device allows multicast forwarding of an electronic device on which DLNA delivery is performed. In this way, after connecting to another routing device, the first electronic device may also discover and use the second electronic device, to avoid a problem that the second electronic device cannot be discovered and controlled in some areas by using the first electronic device. This improves user experience.

According to the ninth aspect, after receiving the DLNA delivery request message and after receiving a first user operation on the second electronic device, the second electronic device displays or plays the content corresponding to the URL. In other words, the routing device forwards only a discovery request of an electronic device on which security confirmation is performed. This may prevent an unauthorized user from using the second electronic device.

According to any one of the ninth aspect and the implementations of the ninth aspect, the DLNA delivery request message further includes an identifier of the first electronic device. The method further includes: After receiving the first user operation on the second electronic device, the second electronic device sends a first record message to the first routing device. The first record message includes the identifier of the first electronic device and the identifier of the second electronic device.

According to any one of the ninth aspect or the implementations of the ninth aspect, after receiving the first record message, the first routing device stores the identifier of the first electronic device and the identifier of the second electronic device on the first routing device. In this way, the routing device may only forwards, in a multicast mode, a message of an electronic device that stores an identifier, to avoid a network storm caused by a large amount of multicast forwarding.

According to any one of the ninth aspect or the implementations of the ninth aspect, the first routing device further sends the first record message to the second routing device. In an implementation, the first routing device sends the first record message to the plurality of routing devices in the network.

According to any one of the ninth aspect or the implementations of the ninth aspect, after receiving the first record message, the second routing device stores the identifier of the first electronic device and the identifier of the second electronic device on the second routing device.

According to any one of the ninth aspect or the implementations of the ninth aspect, the first request message further includes the identifier of the first electronic device. The second routing device forwards the first request message to the first routing device after receiving the first request message and after the identifier of the first electronic device matches an identifier of an electronic device stored on the second routing device.

According to any one of the ninth aspect or the implementations of the ninth aspect, the first request message further includes the identifier of the first electronic device. The first routing device sends the first request message in the multicast mode within the range of the first multicast address after receiving the first request message and after the identifier of the first electronic device matches an identifier of an electronic device stored on the first routing device.

According to a tenth aspect, this application provides a cross-network-segment discovery method. The method is applied to a first routing device. The first routing device, a first electronic device, and a second electronic device are located in a first area. The first electronic device and the second electronic device connect to the first routing device. The first routing device and a second routing device connect to a same local area network. The first routing device and the second routing device provide different network segments. The method includes: The first routing device disconnects from the first electronic device. The first routing device sends a first request message in a multicast mode within a range of a first multicast address after receiving the first request message from the second routing device and after an identifier of the first electronic device matches an identifier of an electronic device stored on the first routing device. The first request message includes a fixed multicast address and the identifier of the first electronic device.

In the method, the first routing device sends, in the multicast mode, a multicast request message sent by an electronic device in a trustlist. In this way, after connecting to another routing device, the first electronic device may also discover and use the second electronic device connecting to the first routing device, to avoid a problem that the second electronic device cannot be discovered and controlled in some areas by using the first electronic device. This improves user experience.

According to an eleventh aspect, this application provides a cross-network-segment discovery method. The method is applied to a second routing device. The second routing device is located in a second area. The second routing device and a first routing device connect to a same local area network. The first routing device is located in a first area. The first routing device and the second routing device provide different network segments. The first routing device is connected by a first electronic device and a second electronic device. The method includes: The second routing device forwards a first request message to the first routing device after receiving the first request message from the first electronic device and after an identifier of the first electronic device matches an identifier of an electronic device stored on the second routing device. The first request message includes a fixed multicast address and the identifier of the first electronic device.

In the method, the second routing device forwards, in a multicast mode, a multicast request message sent by an electronic device in the trustlist. In this way, after connecting to another routing device, the first electronic device may also discover and use the second electronic device connecting to the first routing device, to avoid a problem that the second electronic device cannot be discovered and controlled in some areas by using the first electronic device. This improves user experience.

According to a twelfth aspect, a routing device is provided. The routing device includes: one or more processors; a memory; and one or more computer programs. The one or more computer programs are stored in the memory. When the computer programs are executed by the one or more processors, the routing device is enabled to perform the method according to any one of the tenth aspect or the implementations of the tenth aspect, or perform the method according to any one of the eleventh aspect or the implementations of the eleventh aspect.

According to a thirteenth aspect, this application provides a computer-readable storage medium. The computer-readable storage medium includes a computer program. When the computer program is run on an electronic device, the electronic device is enabled to perform the method according to any one of the tenth aspect or the implementations of the tenth aspect, or perform the method according to any one of the eleventh aspect or the implementations of the eleventh aspect.

According to a fourteenth aspect, this application provides a cross-network-segment discovery system. The system includes a first routing device, a second routing device, a first electronic device, and a second electronic device. The first routing device, the first electronic device, and the second electronic device are located in a first area. The second routing device is located in a second area. The first electronic device and the second electronic device connect to the first routing device. The first routing device and the second routing device connect to a same local area network. The first routing device and the second routing device provide different network segments. The system performs the method according to any one of the ninth aspect or the implementations of the ninth aspect.

DESCRIPTION OF EMBODIMENTS

Figures 1, 2A:
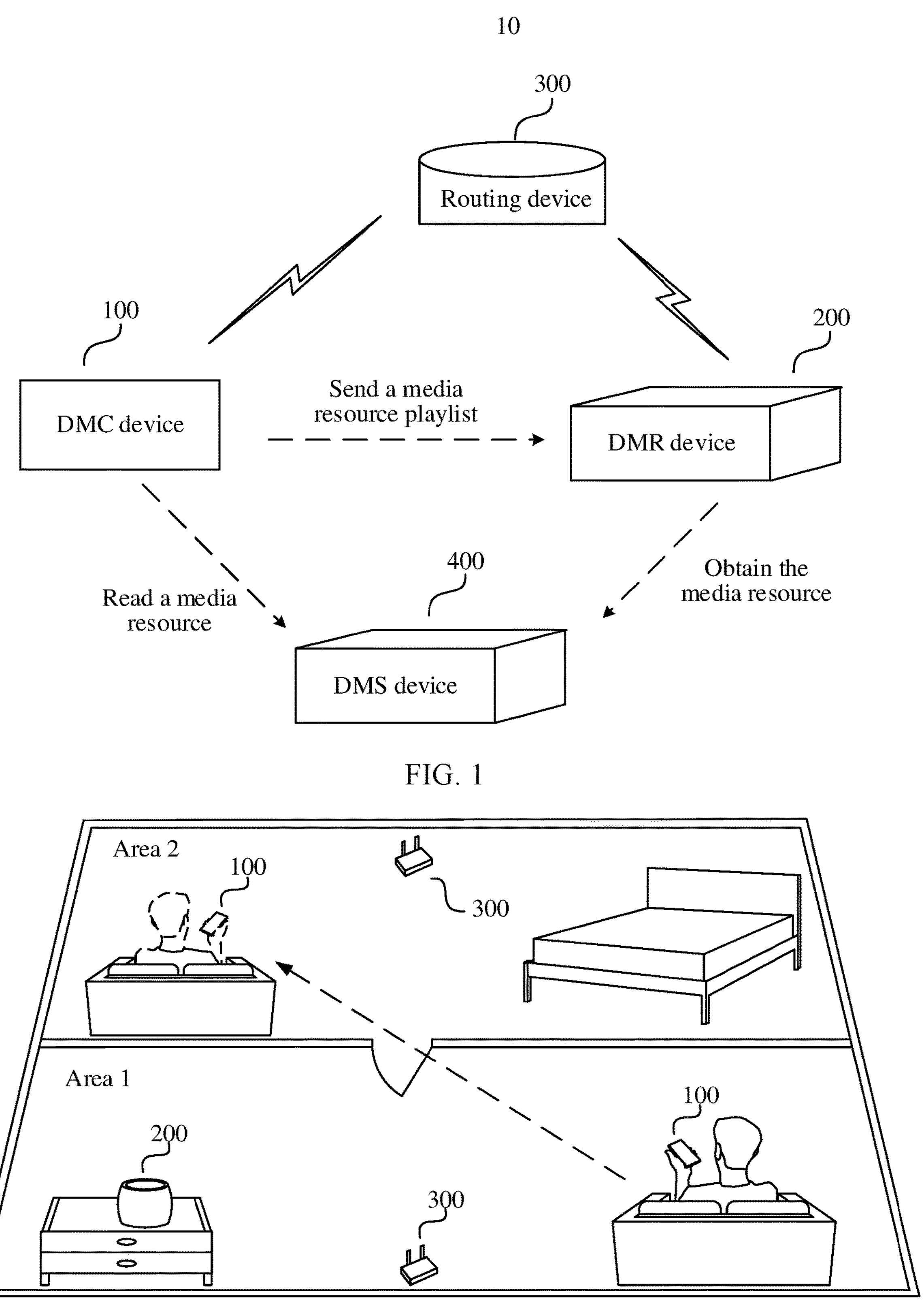
FIG. 1 is a diagram of a system architecture to which a method for discovering and controlling an electronic device across network segments is applicable according to an embodiment of this application.
FIG. 2A is a schematic diagram of a scenario of a method for discovering and controlling an electronic device across network segments according to an embodiment of this application.

Terms used in the following embodiments are merely intended for the purpose of describing specific embodiments, but not intended to limit this application. As used in the specification and the accompanying claims of this application, terms "one", "a type of", "the", "foregoing", "said", and "this" of singular forms are also intended to include an expression such as "one or more", unless otherwise explicitly indicated in the context. It should be further understood that in the following embodiments of this application, "at least one" and "one or more" mean one, two, or more. Term "and/or" is merely used to describe an association relationship between associated objects, and indicates that three relationships may exist. For example, "A and/or B" may indicate: Only A exists, both A and B exist, and only B exists. A and B may be singular or plural. The character "/" usually indicates an "or" relationship between the associated objects.

Reference to "one embodiment", "some embodiments" or the like described in this specification means that one or more embodiments of this application include a specific feature, structure, or characteristic described with reference to this embodiment. Therefore, statements such as "in an embodiment", "in some embodiments", "in some other embodiments", and "in other embodiments" that appear at different places in this specification do not necessarily mean reference to a same embodiment, instead, they mean "one or more but not all of embodiments", unless otherwise specifically emphasized. Terms "include", "comprise", "have", and variations thereof all mean "including, but not limited to", unless otherwise specifically emphasized. Term "connection" includes a direct connection and an indirect connection, unless otherwise indicated.

Terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features.

In an embodiment of this application, the word such as "example" or "for example" is used to represent giving an example, an illustration, or a description. In embodiments of this application, any embodiment or design solution described as "example" or "for example" shall not be explained as being more preferred or advantageous than other embodiments or design solutions. Specifically, use of the words "example" and "for example" is intended to present a relevant concept in a specific way.

A DLNA network may include capability types such as a digital media controller (DMC), a digital media renderer (DMR), and a digital media server (DMS). As a control point of the DLNA, the DMC is responsible for discovering and controlling a DMR device in the DLNA network. For example, after discovering the DMR device in the network, the DMC may send a media playlist to the DMR device. The DMR serves as a media resource renderer of the DLNA and provides a media resource playback capability, for example, plays the media resource based on the media playlist. The DMS is configured to provide media resources.

A device in the DLNA network may have one or more different types of capabilities. For example, a mobile phone, a personal computer (PC), a tablet computer, a laptop computer, or the like may be used as a control device, to provide a DMC capability, or may be used as a local media resource service device, to provide a DMS capability. A smart speaker, a smart TV, a smart screen (also referred to as a smart TV or large screen), a wearable device (for example, a smart watch, smart glasses, a smart headset, a smart band, a smart ring, or a smart helmet), or a vehicle-mounted computer can be used as a playback device, to provide a DMR capability. Optionally, a cloud server of a media resource provider may also provide a DMS capability for the DLNA network.

As shown in FIG. 1, a DMC device 100 is a device that provides a DMC capability in a DLNA network 10, and is a control point of the DLNA. The DMC device 100 is also referred to as a control device 100 in this application. A DMR device 200 is a device that provides a DMR capability in the DLNA network 10, and is a media resource playback device. The DMR device 200 is also referred to as a playback device 200 in this application. A routing device 300 is configured to provide a wireless network connection capability in an area with a specific range. The DMC device 100 and the DMR device 200 may connect to a wireless network provided by the routing device 300, and perform wireless communication according to the DLNA protocol. After connecting to the wireless network, the DMC device 100 and the DMR device 200 may discover each other according to the SSDP protocol of the DLNA. The DMC device 100 may further control the DMR device 200 according to the SOAP protocol. For example, the DMC device 100 reads a media resource from a DMS device 400, and sends a media resource playlist to the DMR device 200. The DMR device 200 obtains the media resource from the DMS device 400 based on the media resource playlist, and plays the obtained media resource.

A network segment means that a part of a computer network that can directly communicate by using the same physical layer device (for example, transmission medium, repeater, or hub). If the same network address is obtained after an AND operation is performed on IP addresses and subnet masks of different electronic devices, the different electronic devices are on a same network segment.

Unicast: A one-to-one communication mode between hosts in the network.

Broadcast: A one-to-all communication mode between hosts.

Multicast (also referred to as Mutti-cast): A one-to-one group communication mode between hosts in a network. An IP address used for multicast is referred to as a multicast address. In the DLNA, the multicast address is fixed at 239.255.255.250:1900. IP addresses are classified into five classes: A, B, C, D, and E. Class D addresses are multicast addresses (also referred to as multicast addresses), ranging from 224.0.0.0 to 239.255.255.255.

The following describes in detail a method for discovering and controlling an electronic device across network segments provided in an embodiment of this application by using an example in which a mobile phone is used as the DMC device 100, a smart speaker is used as the DMR device 200, a router is used as the routing device 300, and a mobile phone delivers music to the smart speaker based on the DLNA.

For example, as shown in FIG. 2A, a house of a user includes an area 1 and an area 2. The area 1 and the area 2 are separately configured with a router 300, and the router 300 supports the DLNA protocol. The two routers 300 intelligently network, to provide a wireless network in each of areas of the two routers. Wireless fidelity (Wi-Fi) names of the two routers 300 are the same. The router 300 in the area 1 is a router 1, the router 1 provides the wireless network in the area 1, and a Wi-Fi network segment is a network segment 1. The router 300 in the area 2 is a router 2, the router 2 provides the wireless network in the area 2, and a Wi-Fi network segment is a network segment 2. When the user moves between the area 1 and the area 2 with the mobile phone 100, the router connected to the mobile phone 100 does not need to be manually switched. The mobile phone 100 automatically connects to a wireless network provided by a router with a strongest signal in Wi-Fi networks with the same name (for example, the same SSID).

For example, the user is located in the area 1 with the mobile phone 100, and the mobile phone 100 connects to a wireless network provided by the router 1. The smart speaker 200 in the area 1 also connects to the wireless network provided by the router 1. In this case, the mobile phone 100 and the smart speaker 200 are located on the same network segment. All devices on the network segment can send messages to an SSDP port of a specified multicast address and listen to SSDP port messages of the specified multicast address, to discover another device on the same network segment. In this way, a music application (APP) (for example, Huawei Music) with a DLNA delivery function on the mobile phone 100 and the smart speaker 200 with an enabled DLNA discovery function discover each other.

Figure 2B:
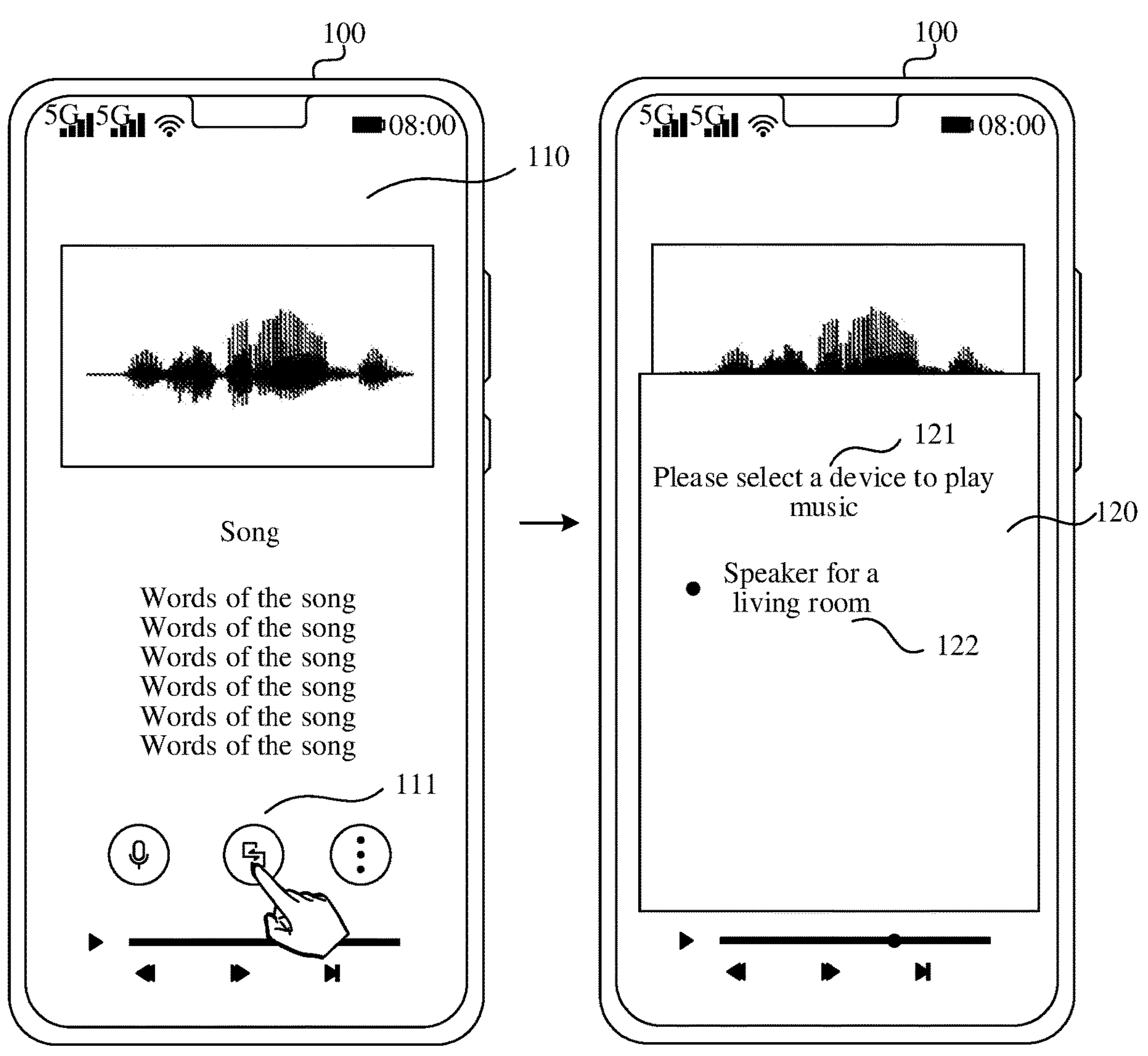
FIG. 2B is a schematic diagram of a graphical user interface of a DLNA delivery scenario.

For example, as shown in FIG. 2B, the user opens a music APP on the mobile phone 100, the mobile phone 100 displays a playback interface 110 of the music APP, and the playback interface 110 includes a "Delivery" icon 111. The mobile phone 100 receives an operation of tapping the "Delivery" icon 111 by the user, and in response to the operation of tapping the "Delivery" icon 111 by the user, the mobile phone 100 sends a request message to the SSDP port of the specified multicast address. The smart speaker 200 listens to the request message on the SSDP port of the specified multicast address, and sends a response message to the mobile phone 100. In this way, the mobile phone 100 and the smart speaker 200 discover each other. The mobile phone 100 displays a "Delivery" page 120. The "Delivery" page 120 includes prompt information 121, and the prompt information 121 prompts the user to select a target device for delivery. The "Delivery" page 120 includes a "Speaker for a living room" option 122. If the mobile phone 100 receives an operation of tapping the "Speaker for a living room" option 122 by the user, it is determined that the target device for delivery is a smart speaker.

The music APP on the mobile phone 100 provides a uniform resource locator (URL) link of online music for the smart speaker 200, and the smart speaker 200 obtains an online music resource from a cloud server based on the obtained URL link of the online music, and plays the online music. That is, the music APP on the mobile phone 100 delivers the online music to the smart speaker 200. Further, the user may control volume of the smart speaker 200, switch a played music, and the like by using the music APP on the mobile phone 100.

In some scenarios, the user moves to the area 2 with the mobile phone 100, and the mobile phone 100 connects to a wireless network provided by the router 2. The mobile phone 100 and the smart speaker 200 are located on different network segments. Because no multicast packet is forwarded between the router 1 and the router 2, a message sent by the mobile phone 100 to an SSDP port of a specified multicast address on the network segment 2 cannot be listened to by the smart speaker 200 on the network segment 1, and a message sent by the smart speaker 200 to an SSDP port of a specified multicast address on the network segment 1 cannot be listened to by the mobile phone 100 on the network segment 2. The music APP on the mobile phone 100 and the smart speaker 200 cannot discover each other. Consequently, the music APP cannot deliver the online music to the smart speaker 200 and perform other control.

Figure 2C:
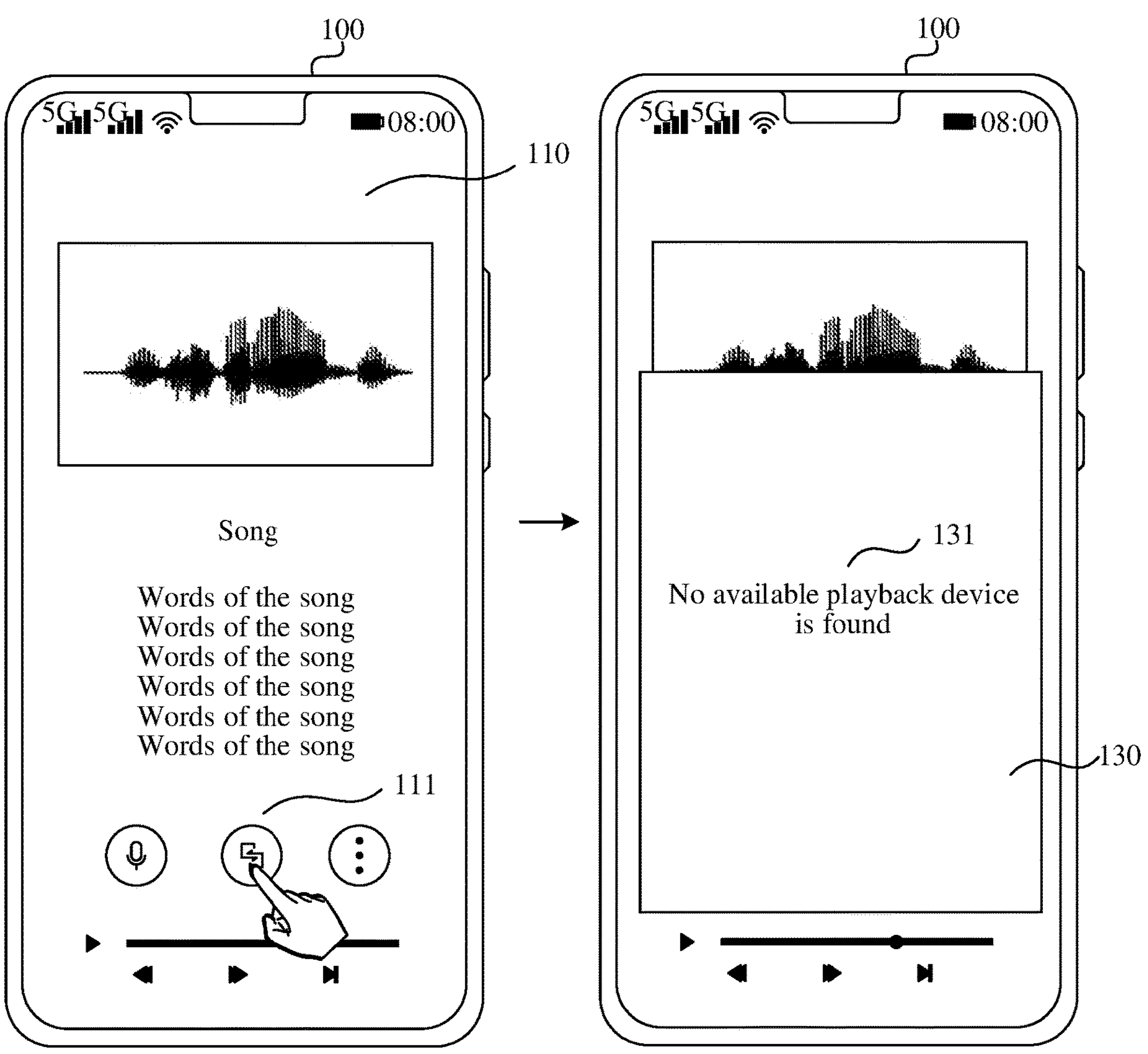
FIG. 2C is a schematic diagram of a graphical user interface of a DLNA delivery scenario.

For example, as shown in FIG. 2C, the mobile phone 100 displays a playback interface 110 of the music APP, and the playback interface 110 includes a "Delivery" icon 111. The mobile phone 100 receives an operation of tapping the "Delivery" icon 111 by the user, and in response to the operation of tapping the "Delivery" icon 111 by the user, the mobile phone 100 sends a request message to the SSDP port of the specified multicast address. Because no multicast packet is forwarded between the router 1 and the router 2, the smart speaker 200 cannot listen to the request message. The music APP on the mobile phone 100 and the smart speaker 200 cannot discover each other. The mobile phone 100 displays a "Delivery" page 130. The "Delivery" page 130 includes prompt information 131, and the prompt information 131 prompts the user that no available playback device is found.

In this way, when the user moves around the house with the mobile phone, the mobile phone may not be able to perform DLNA delivery to the smart speaker in some areas.

Embodiments of this application provide a method for discovering and controlling an electronic device across network segments, to implement mutual discovery between a control device and a playback device on different network segments, and further control the playback device by using the control device.

Figure 3:
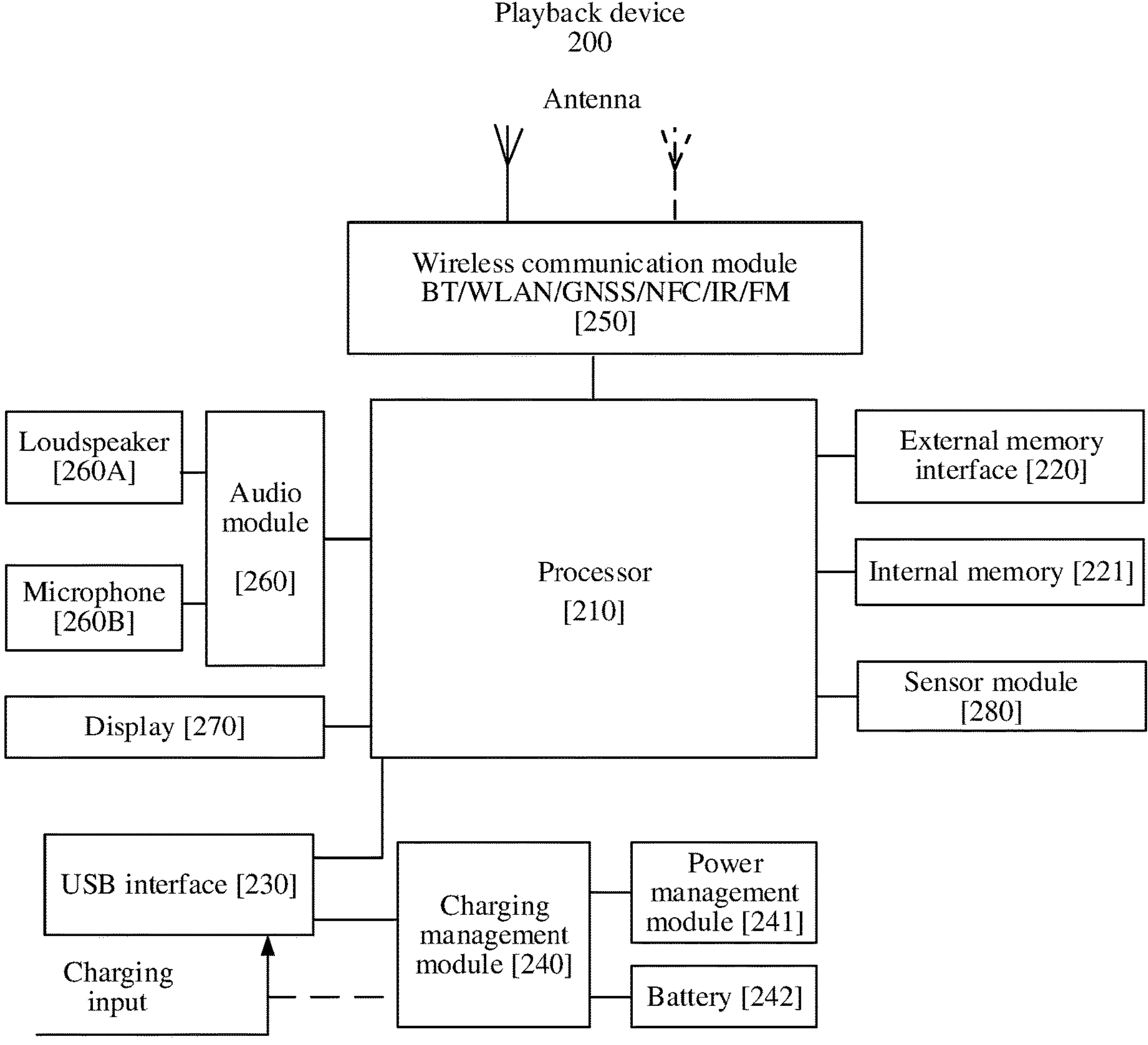
FIG. 3 is a schematic diagram of a hardware structure of an electronic device according to an embodiment of this application.

For example, the playback device 200 in embodiments of this application may include a structure shown in FIG. 3. The playback device 200 may include a processor 210, an external memory interface 220, an internal memory 221, a universal serial bus (USB) interface 230, a charging management module 240, a power management module 241, a battery 242, an antenna, a wireless communication module 250, an audio module 260, a loudspeaker 260A, a microphone 260B, a display 270, a sensor module 280, and the like. The sensor module 280 may include a pressure sensor, a barometric pressure sensor, a magnetic sensor, a distance sensor, an optical proximity sensor, a fingerprint sensor, a touch sensor, an ambient light sensor, and the like.

It may be understood that the structure shown in this embodiment of this application does not constitute a specific limitation on the playback device 200. In some other embodiments of this application, the playback device 200 may include more or fewer components than those shown in the figure, or may combine some components, or may split some components, or may have different component arrangements. The components shown in the figure may be implemented by hardware, software, or a combination of software and hardware.

The processor 210 may include one or more processing units. For example, the processor 210 may include an application processor, a modem processor, a graphics processing unit (GPU), an image signal processor (ISP), a controller, a video codec, a digital signal processor (DSP), a baseband processor, a neural-network processing unit (NPU), and/or the like. Different processing units may be separate components or may be integrated into one or more processors. In some embodiments, the playback device 200 may alternatively include one or more processors 210. The controller may generate an operation control signal based on an instruction operation code and a time sequence signal, to complete control of fetching instructions and executing instructions.

A memory may be further disposed in the processor 210, to store instructions and data. In some embodiments, the memory in the processor 210 is a cache. The memory may store instructions or data recently used or cyclically used by the processor 210. If the processor 210 needs to use the instructions or data again, the processor 210 may directly invoke the instructions or the data from the memory. Repeated access is avoided, and waiting time of the processor 210 is reduced, so that system efficiency is improved.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

A USB interface 230 is an interface that complies with USB standard specifications, and may be specifically a Mini USB interface, a Micro USB interface, a USB Type C interface, or the like. The USB interface 230 may be configured to connect to a charger to charge the playback device 200, and may also be configured to transmit data between the playback device 200 and a peripheral device. The USB interface 230 may be further configured to connect to a headset and play audio by using a headset. The interface may be further configured to connect to another electronic device such as an AR device.

It may be understood that an interface connection relationship between the modules shown in this embodiment of this application is merely a schematic description, and does not constitute a limitation on a structure of the playback device 200. In some other embodiments of this application, the playback device 200 may use an interface connection manner different from that in the foregoing embodiments or a combination of a plurality of interface connection manners.

The charging management module 240 is configured to receive a charging input from the charger. The charger may be a wireless charger, or may be a wired charger. In some embodiments of wired charging, the charging management module 240 may receive a charging input of a wired charger through the USB interface 230. In some embodiments of wireless charging, the charging management module 240 may receive a wireless charging input by using a wireless charging coil of the playback device 200. While charging the battery 242, the charging management module 240 may further supply power to the playback device by using the power management module 241.

The power management module 241 is configured to connect to the battery 242, the charging management module 240, and the processor 210. The power management module 241 receives an input of the battery 242 and/or the charging management module 240, and supplies power to the processor 210, the internal memory 221, the display 270, the wireless communication module 250, and the like. The power management module 241 may be further configured to monitor parameters such as a battery capacity, a battery cycle count, and a battery health status (leakage or impedance). In some other embodiments, the power management module 241 may alternatively be disposed in the processor 210. In some other embodiments, the power management module 241 and the charging management module 240 may be alternatively disposed in a same component.

The antenna is configured to transmit and receive electromagnetic wave signals. Each antenna in the playback device 200 may be configured to cover one or more communication bands. Different antennas may be multiplexed, to improve antenna utilization.

The wireless communication module 250 may provide a wireless communication solution that is applied to the playback device 200, including a wireless local area network (WLAN) (such as a wireless fidelity (Wi-Fi) network), Bluetooth (BT), global navigation satellite system (GNSS), frequency modulation (FM), near field communication (NFC), infrared (IR), and the like. The wireless communication module 250 may be one or more devices integrating at least one communication processing module. The wireless communication module 250 receives an electromagnetic wave over the antenna, performs frequency modulation and filtering processing on the electromagnetic wave signal, and sends a processed signal to the processor 210. The wireless communication module 250 may further receive a to-be-sent signal from the processor 210, perform frequency modulation and amplification on the signal, and convert the signal into an electromagnetic wave for radiation by using the antenna.

The playback device 200 implements a display function by using the GPU, the display 270, the application processor, and the like. The GPU is a microprocessor for image processing, and connects the display 270 and the application processor. The GPU is configured to perform mathematical and geometric calculation for graphics rendering. The processor 210 may include one or more GPUs that execute program instructions, to generate or change display information.

The display 270 is configured to display an image, a video, and the like. The display 270 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the playback device 200 may include one or N displays 270, where N is a positive integer greater than 1.

The internal memory 221 may include one or more random access memories (RAM) and one or more non-volatile memories (NVM). The random access memory may include a static random access memory (SRAM), a dynamic random access memory (DRAM), a synchronous dynamic random access memory (SDRAM), a double data rate synchronous dynamic random access memory (DDR SDRAM, for example, a 5th generation DDR SDRAM is usually referred to as a DDR5 SDRAM), and the like. The non-volatile memory may include a magnetic disk storage device and a flash memory. The flash memory may be classified, based on an operating principle, into an NOR FLASH, an NAND FLASH, a 3D NAND FLASH, and the like. The flash memory may be classified, based on a quantity of electric potential levels of a cell, into a single-level storage unit (SLC), a multi-level storage unit (MLC), a triple-level storage unit (triple-level cell, TLC), a quad-level storage unit (quad-level cell, QLC), and the like. The flash memory may be classified, based on a storage specification, into a universal flash storage (UFS), an embedded multi media Card (eMMC), and the like. The random access memory may be directly read and written by the processor 210, and may be configured to store an executable program (for example, a machine instruction) of an operating system or another running program, and may be further configured to store data of a user and an application program. The non-volatile memory may also store an executable program, data of a user, data of an application, and the like, which may be loaded into the memory in advance for directly reading and writing by the processor 210.

The external memory interface 220 may be configured to connect to an external non-volatile memory, to expand a storage capacity of the playback device 200. The external non-volatile memory communicates with the processor 210 through the external memory interface 220, to implement a data storage function. For example, files such as music and videos are stored in the external non-volatile memory.

The playback device 200 may use the audio module 260, the loudspeaker 260A, the microphone 260B, the application processor, and the like to implement an audio function such as music playing and sound recording.

The audio module 260 is configured to convert digital audio information into an analog audio signal for outputting, and is further configured to convert an analog audio input into a digital audio signal. The audio module 260 may be further configured to encode and decode audio signals. In some embodiments, the audio module 260 may be disposed in the processor 210, or some functional modules of the audio module 260 may be disposed in the processor 210.

The loudspeaker 260A, also referred to as a "horn", is configured to convert an electrical signal of audio into a sound signal. The playback device 200 may play music through the loudspeaker 260A.

The microphone 260B, also referred to as a "mic" or "mike", is configured to convert a sound signal into an electrical signal. The user may speak with the mouth approaching the microphone 260B, to input a sound signal into the microphone 260B. The playback device 200 may be provided with at least one microphone 260B. In some other embodiments, the playback device 200 may be provided with two microphones 260B, to implement a noise reduction function in addition to collecting a sound signal. In some other embodiments, the playback device 200 may alternatively be provided with three, four, or more microphones 260B to obtain sound signals, reduce noise, identify sound sources, implement directional recording, and the like.

Figure 4:
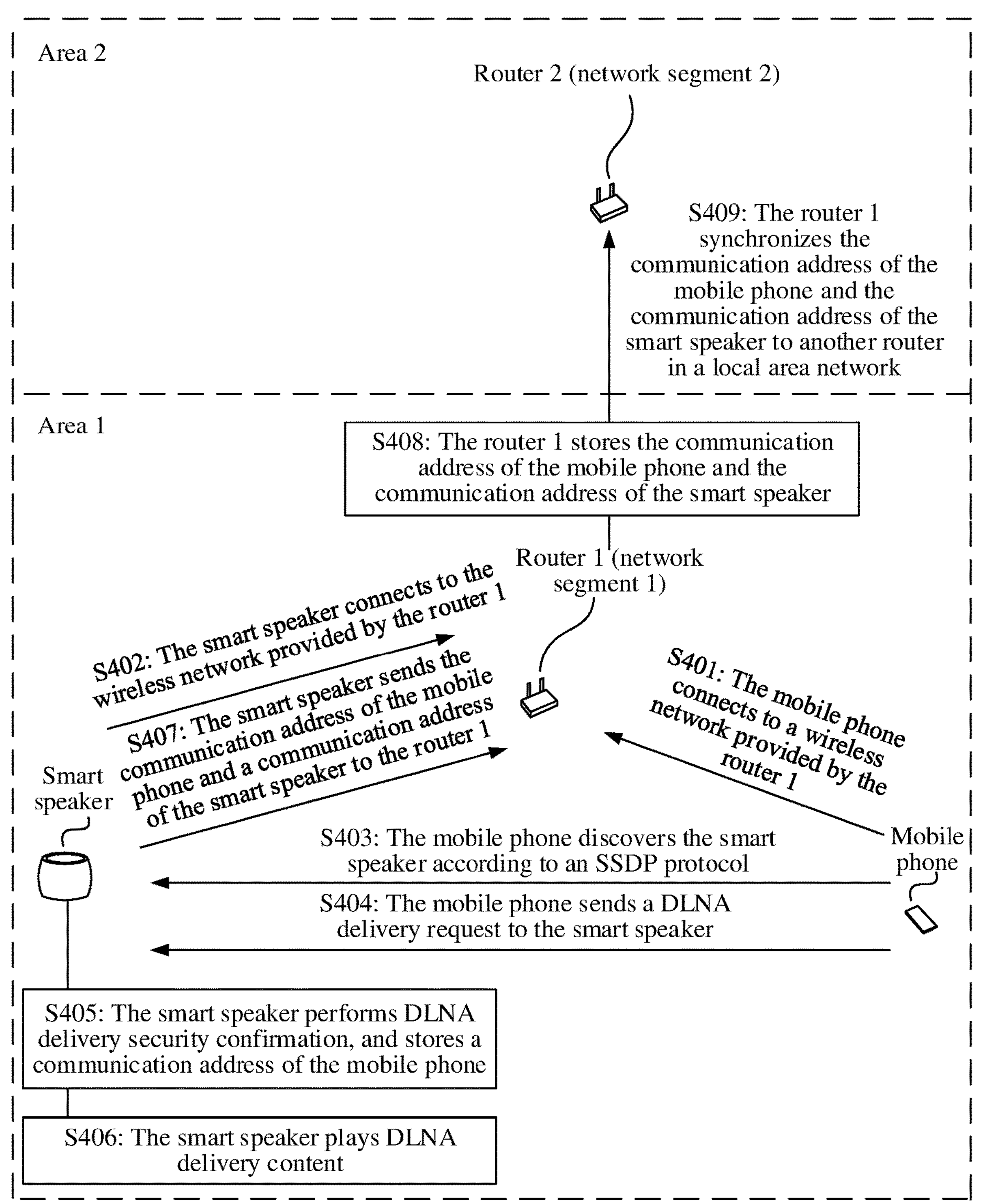
FIG. 4 is a schematic flowchart of a method for discovering and controlling an electronic device across network segments according to an embodiment of this application.

An embodiment of this application provides a method for discovering and controlling an electronic device across network segments. As shown in FIG. 4, the method may include the following steps.

S401: A mobile phone connects to a wireless network provided by a router 1.

For example, a house of a user includes an area 1 (a living room) and an area 2 (a bedroom 1). The living room and the bedroom 1 are separately configured with a router, and the two routers intelligently network, to provide a wireless network in the house. The router in the living room is a router 1, the router 1 provides the wireless network in the living room, and a Wi-Fi network segment is a network segment 1. The router in the bedroom 1 is a router 2, the router 2 provides the wireless network in the bedroom 1, and a Wi-Fi network segment is a network segment 2.

The user enters the living room with the mobile phone, and the mobile phone establishes a Wi-Fi connection to the router 1.

S402: A smart speaker connects to the wireless network provided by the router 1.

The smart speaker establishes a Wi-Fi connection to the router 1. In this way, the mobile phone and the smart speaker connect to a same router and are located on a same Wi-Fi network segment.

It may be understood that a sequence of S401 and S402 is not limited in this embodiment of this application.

S403: The mobile phone discovers the smart speaker according to an SSDP protocol.

In some embodiments, the mobile phone sends a discovery message to an SSDP port of a specified multicast address. For example, the mobile phone sends an "ssdp: discover" message according to an M-SEARCH method. If the smart speaker listens to the "ssdp:discover" message sent by the mobile phone at the specified multicast address, the smart speaker sends a response message to the mobile phone in a unicast mode. After receiving the response message from the smart speaker, the mobile phone discovers the smart speaker.

In some other embodiments, the smart speaker sends a heartbeat message to an SSDP port of a specified multicast address. For example, the smart speaker sends an "ssdp: alive" message according to a NOTIFY method. If the mobile phone listens to the "ssdp:alive" message sent by the smart speaker at the specified multicast address, the mobile phone discovers the smart speaker.

In an example, the user opens a music app (for example, Huawei Music) that supports DLNA delivery on the mobile phone, and the mobile phone discovers the smart speaker according to the SSDP protocol. For example, as shown in FIG. 2B, the user opens a music APP on a mobile phone 100, the mobile phone 100 displays a playback interface 110 of the music APP, and the playback interface 110 includes a "Delivery" icon 111. The mobile phone 100 receives an operation of tapping the "Delivery" icon 111 by the user, and in response to the operation of tapping the "Delivery" icon 111 by the user, the mobile phone 100 sends a request message (discover) to the SSDP port of the specified multicast address. The smart speaker 200 listens to the request message on the SSDP port of the specified multicast address, and sends a response message to the mobile phone 100. In this way, the mobile phone 100 and the smart speaker 200 discover each other. The mobile phone 100 displays a "Delivery" page 120. The "Delivery" page 120 includes prompt information 121, and the prompt information 121 prompts the user to select a target device for delivery. The "Delivery" page 120 includes a "Speaker for a living room" option 122. If the mobile phone 100 receives an operation of tapping the "Speaker for a living room" option 122 by the user, it is determined that the target device for delivery is a smart speaker.

S404: The mobile phone sends a DLNA delivery request to the smart speaker.

DLNA delivery includes device control and event subscription. The device control includes: The mobile phone sends a request message to the smart speaker according to the SOAP protocol. The smart speaker receives the request message, performs a corresponding action based on the request message, and sends a response message to the mobile phone. In this way, the mobile phone can be used to control a function of the smart speaker, such as playing, pausing, adjusting volume, or controlling a progress bar. The event subscription indicates that if the mobile phone subscribes to a smart speaker status change event, when the smart speaker status changes (for example, a button on a side of the smart speaker is pressed, to mute or adjust the volume), the smart speaker sends a status change notification to the mobile phone, and the mobile phone performs a corresponding action (for example, when the smart speaker button is pressed, to mute, the mobile phone switches from a playback state to a pause state) based on the status change notification.

The mobile phone receives an operation that the user selects to play music on the smart speaker (for example, the mobile phone 100 receives the operation of tapping the "Speaker for a living room" option 122 by the user), to send the DLNA delivery request to the smart speaker according to the SOAP protocol. Optionally, the smart speaker sends a DLNA delivery response to the mobile phone.

S405: The smart speaker performs DLNA delivery security confirmation, and stores a communication address of the mobile phone.

In an implementation, the smart speaker receives the DLNA delivery request of the mobile phone, and performs DLNA delivery security confirmation. This may prevent an unauthorized user from controlling the smart speaker.

Optionally, the smart speaker sends security confirmation prompt information. The security confirmation prompt information prompts the user to perform a security confirmation operation. If the smart speaker receives the security confirmation operation of the user, it is determined that DLNA delivery security is confirmed successfully.

For example, the top of the smart speaker is provided with a function key. The smart speaker plays a voice "Please tap a function key on the top of a speaker, to confirm delivery". Alternatively, the function key on the top of the smart speaker blinks. Alternatively, a display of the smart speaker displays a message "Please tap a function key on the top of a speaker, to confirm delivery". If the smart speaker receives an operation of tapping the function key on the top of the smart speaker by the user, it is determined that a security confirmation operation of the user is received.

For another example, a display of the smart speaker displays a "Security confirmation" button. The smart speaker plays a voice "Please select a security confirmation button on a display, to confirm delivery". Alternatively, the display of the smart speaker displays information "Please select a security confirmation button on a display, to confirm delivery". If the smart speaker receives an operation of tapping the "Security confirmation" button by the user on the display, or receives an operation of selecting the "Security confirmation" button by the user by using a remote control, it is determined that the security confirmation operation of the user is received.

For still another example, the smart speaker plays a voice "Please confirm whether to deliver, if yes, please say yes". If the smart speaker receives a voice "Yes" of the user, it is determined that a security confirmation operation of the user is received.

In an implementation, after receiving a DLNA delivery request of a mobile phone for the first time, the smart speaker performs DLNA delivery security confirmation. Subsequently, when receiving a DLNA delivery request of the same mobile phone, the smart speaker does not perform DLNA delivery security confirmation. In other words, a same mobile phone only needs to be performed security confirmation on for one time. For example, after the smart speaker receives the DLNA delivery request of the mobile phone, if it is determined that a stored communication address (for example, a medium access control (medium access control, MAC) address) of the mobile phone does not exist, DLNA delivery security confirmation is performed, and the communication address of the mobile phone is stored. If it is confirmed that a stored communication address of the mobile phone exists, DLNA delivery security confirmation is not performed.

In an implementation, the smart speaker stores a first trustlist, and the first trustlist includes a communication address (for example, a MAC address) of a control device on which DLNA delivery security confirmation is performed on the smart speaker. The smart speaker receives the DLNA delivery request of the mobile phone, and adds a communication address (for example, a MAC address) of the mobile phone to the first trustlist.

Optionally, in some embodiments, after receiving a DLNA delivery request of a mobile phone for the first time, the smart speaker determines that a stored communication address of the mobile phone exists. For example, the mobile phone controls the smart speaker by using a control APP of the smart speaker, and the smart speaker stores the communication address of the mobile phone. DLNA delivery security confirmation is not performed. The smart speaker adds the communication address (for example, a MAC address) of the mobile phone to the first trustlist. In this way, provided that a device is a device (does not perform DLNA delivery to the smart speaker) that connects to the smart speaker, DLNA delivery security confirmation does not need to be performed on. This brings convenience to the user.

S406: The smart speaker plays DLNA delivery content.

In some embodiments, the mobile phone sends a media resource playlist (for example, the DLNA delivery request includes the media resource playlist) to the smart speaker. The smart speaker obtains, based on the media resource playlist, a media resource from a server that provides the media resource, and plays the obtained media resource.

S407: The smart speaker sends the communication address of the mobile phone and a communication address of the smart speaker to the router 1.

In an implementation, the smart speaker reports a DLNA delivery security confirmation event to the router 1, and the event includes the communication address (for example, the MAC address) of the mobile phone and the communication address (for example, the MAC address) of the smart speaker.

It may be understood that the smart speaker may perform S406 first and then perform S407, or perform S407 first and then perform S406, or simultaneously perform S406 and S407. A sequence of performing S406 and S407 does not affect a technical effect of this embodiment of this application. A sequence of performing S406 and S407 is not limited in this embodiment of this application. In some embodiments, the smart speaker may not play DLNA delivery content. For example, if the smart speaker fails to obtain a playback resource, the smart speaker does not play the resource.

S408: The router 1 stores the communication address of the mobile phone and the communication address of the smart speaker.

In an implementation, the router stores a second trustlist. The second trustlist includes a communication address (for example, a MAC address) of a control device or a playback device in a local area network. For a multicast message sent by the communication address in the second trustlist, forwarding in the multicast mode between routers in the local area network is supported. For a multicast message sent by the communication address that is not in the second trustlist, forwarding cannot be performed in the multicast mode between routers in the local area network. That is, the router allows the SSDP multicast of the communication address in the second trustlist.

The router 1 receives a communication address of the mobile phone and a communication address of the smart speaker that are sent by the smart speaker, and adds the communication address of the mobile phone and the communication address of the smart speaker to the second trustlist.

S409: The router 1 synchronizes the communication address of the mobile phone and the communication address of the smart speaker to another router in the local area network.

If the second trustlist stored on any router in the local area network changes, another router in the local area network is notified to update based on a new second trustlist.

For example, the home local area network in FIG. 4 is intelligently networked by the router 1 and the router 2. The router 1 receives a MAC address of the mobile phone 100 and a MAC address of the smart speaker 200, and adds the MAC address of the mobile phone 100 and the MAC address of the smart speaker 200 to the second trustlist on the router 1. The router 2 is notified to synchronize the second trustlist on the router 1, and the MAC address of the mobile phone 100 and the MAC address of the smart speaker 200 are also added to the second trustlist on the router 2. In this way, the multicast message sent by the mobile phone 100 or the smart speaker 200 may be forwarded between the routers (the router 1 and the router 2) in the local area network. When the mobile phone 100 and the smart speaker 200 are not on a same network segment, the mobile phone 100 and the smart speaker 200 may also monitor a multicast message sent by the peer end, so as to discover each other.

Figure 5A:
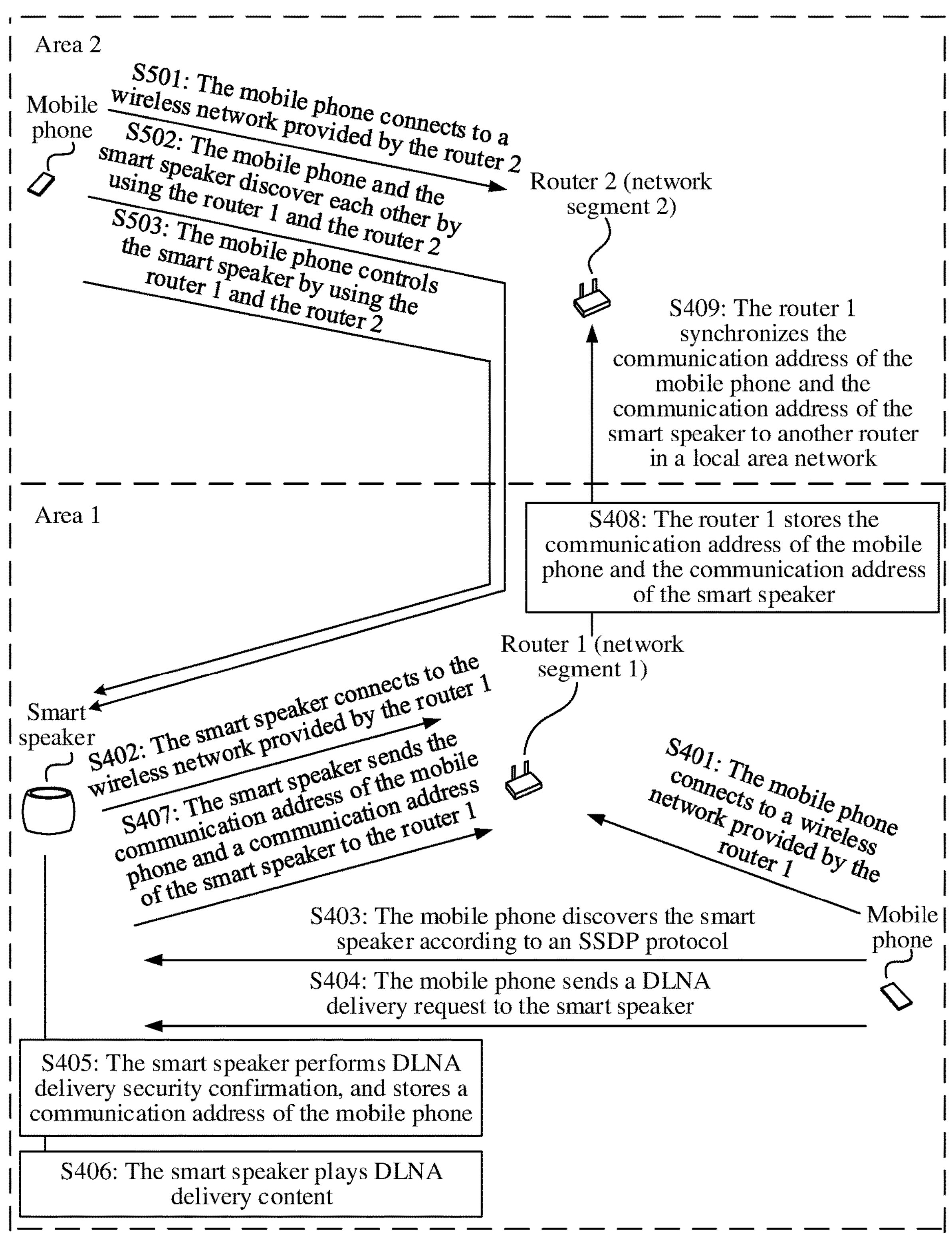
FIG. 5A is a schematic flowchart of a method for discovering and controlling an electronic device across network segments according to an embodiment of this application.

In some embodiments, when the user uses the smart speaker to play the DLNA delivery content, the user leaves a current area (the living room) with the mobile phone, and the mobile phone disconnects from the router 1. The user enters the bedroom 1 with the mobile phone, the mobile phone connects to the wireless network provided by the router 2, and the Wi-Fi network segment of the router 2 is the network segment 2. With reference to FIG. 4, as shown in FIG. 5A, the method further includes the following steps.

S501: The mobile phone connects to the wireless network provided by the router 2.

The mobile phone disconnects a wireless connection to the router 1, and establishes a wireless connection to the router 2

S502: The mobile phone and the smart speaker discover each other by using the router 1 and the router 2.

In some examples, after connecting to the router 2, the mobile phone sends a discovery message to the SSDP port of the specified multicast address. For example, the mobile phone sends the "ssdp:discover" message according to an M-SEARCH method. The router 2 determines that the second trustlist includes the communication address of the mobile phone, and forwards, in the multicast mode, the “ssdp:discover” message sent by the mobile phone between the routers (for example, the router 1 and the router 2) in the local area network. In this way, a device on the network segment of the router 1 can also listen to the “ssdp:discover” message sent by the mobile phone. If the smart speaker listens to the “ssdp:discover” message sent by the mobile phone at the specified multicast address, the smart speaker sends the response message to the mobile phone in the unicast mode. Specifically, the response message sent by the smart speaker is forwarded by the router 1 to the router 2, and then forwarded by the router 2 to the mobile phone. After receiving the response message from the smart speaker, the mobile phone discovers the smart speaker. Optionally, in an implementation, the router 1 receives the “ssdp:discover” message forwarded by the router 2, determines that the second trustlist includes the communication address of the mobile phone, and multicasts the “ssdp: discover” message on a fixed multicast address.

In some other examples, the smart speaker periodically (for example, a period is 4s) sends the heartbeat message to the SSDP port of the specified multicast address. For example, the smart speaker sends the “ssdp:alive” message to the SSDP port of the specified multicast address. Because the second trustlist includes the communication address of the smart speaker, the router 1 forwards, in the multicast mode, the “ssdp:alive” message sent by the smart speaker between the routers (the router 1 and the router 2) in the local area network, and forwards the “ssdp:alive” message to the router 2 in the multicast mode. A device on the network segment of the router 2 can listen to the “ssdp:alive” message sent by the smart speaker. In this way, if the mobile phone listens to the “ssdp:alive” message, the mobile phone discovers the smart speaker. Optionally, in an implementation, the router 2 receives the “ssdp:alive” message forwarded by the router 1, determines that the second trustlist includes the communication address of the smart speaker, and multicasts the “ssdp:alive” message on a fixed multicast address.

S503: The mobile phone controls the smart speaker by using the router 1 and the router 2.

After discovering the smart speaker, the mobile phone may send a control message to the smart speaker. The control message is forwarded by the router 2 to the router 1, and the router 1 sends the control message to the smart speaker. The mobile phone can also resubscribe to the smart speaker status change event. The smart speaker status change event is forwarded by the router 1 to the router 2, and the router 2 sends the event to the mobile phone. In this way, when the user uses the smart speaker to play the DLNA delivery content, the user leaves the current area (the living room) with the mobile phone and enters the bedroom 1, so that the mobile phone and the smart speaker are located on different network segments. The phone can discover and control the smart speaker across network segments, and resubscribe to the event of the smart speaker, and that the smart speaker plays the DLNA delivery content is not affected.

Figure 5B:
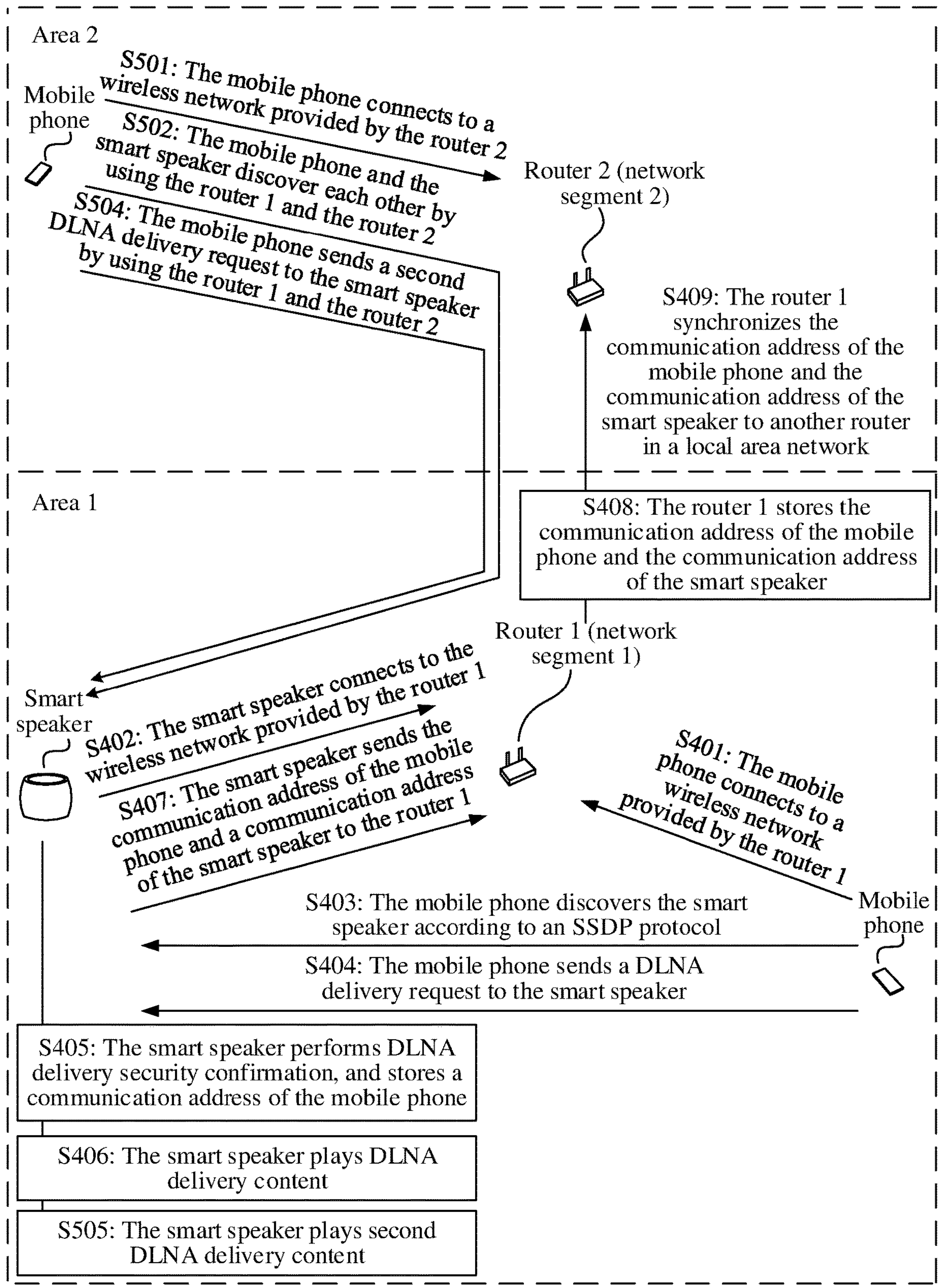
FIG. 5B is a schematic flowchart of a method for discovering and controlling an electronic device across network segments according to an embodiment of this application.

In some other embodiments, the user ends using the smart speaker to play the DLNA delivery content in the current area (the living room). Then, the user enters the bedroom 1 with the mobile phone, the mobile phone connects to the wireless network provided by the router 2, and the Wi-Fi network segment of the router 2 is the network segment 2. With reference to FIG. 4, as shown in FIG. 5B, the method further includes the following steps.

S501: The mobile phone connects to the wireless network provided by the router 2.

The mobile phone disconnects a wireless connection to the router 1, and establishes a wireless connection to the router 2

S502: The mobile phone and the smart speaker discover each other by using the router 1 and the router 2.

S504: The mobile phone sends a second DLNA delivery request to the smart speaker by using the router 1 and the router 2.

For example, the mobile phone sends a DLNA delivery request to the smart speaker. The DLNA delivery request is forwarded to the smart speaker by using the router 2 and the router 1. The smart speaker receives the DLNA delivery request. Optionally, the smart speaker sends a DLNA delivery response to the mobile phone. The DLNA delivery response is forwarded to the mobile phone by using the router 1 and the router 2. In this way, the mobile phone can be used to control a function of the smart speaker, such as playing, pausing, adjusting volume, or controlling a progress bar.

For example, as shown in FIG. 2B, the user opens a music APP on a mobile phone 100, the mobile phone 100 displays a playback interface 110 of the music APP, and the playback interface 110 includes a “Delivery” icon 111. The mobile phone 100 receives an operation of tapping the “Delivery” icon 111 by the user, and in response to the operation of tapping the “Delivery” icon 111 by the user, the mobile phone 100 sends a request message (discover) to the SSDP port of the specified multicast address. The router 2 forwards, in the multicast mode, the request message (discover) between the routers in the local area network. The smart speaker 200 listens to the request message, and sends a response message to the mobile phone 100 by using the router 1 and the router 2. In this way, the mobile phone 100 and the smart speaker 200 discover each other. The mobile phone 100 displays the “Delivery” page 120. The “Delivery” page 120 includes prompt information 121, and the prompt information 121 prompts the user to select a target device for delivery. The “Delivery” page 120 includes the “Speaker for a living room” option 122. If the mobile phone 100 receives the operation of tapping the “Speaker for a living room” option 122 by the user, it is determined that the target device for delivery is a smart speaker.

S505: The smart speaker plays second DLNA delivery content.

In some embodiments, the mobile phone sends a media resource playlist (for example, the DLNA delivery request includes the media resource playlist) to the smart speaker. The smart speaker obtains, based on the media resource playlist, a media resource from a server that provides the media resource, and plays the obtained media resource.

If the phone subscribes to the smart speaker status change event, when the smart speaker status changes (for example, a button on a side of the smart speaker is pressed, to mute or adjust the volume), the smart speaker forwards a status change notification to the mobile phone by using the router 1 and the router 2, and the mobile phone performs a corresponding action (for example, when the smart speaker button is pressed, to mute, the mobile phone switches from a playback state to a pause state) based on the status change notification.

According to the method for discovering and controlling an electronic device across network segments provided in this embodiment of this application, when the mobile phone and the smart speaker are located on a same network segment, the mobile phone performs DLNA delivery to the smart speaker for at least one time, and performs DLNA delivery security confirmation when DLNA delivery is performed for the first time. The router allows multicast forwarding of the electronic device on which security confirmation is performed. Subsequently, the user can use the mobile phone to discover and use the smart speaker on another network segment of the local area network, to avoid a problem that the smart speaker cannot be used in some areas, so as to improve user experience.

In some embodiments, the smart speaker is restored to factory settings (for example, the smart speaker is reset), the smart speaker reports a communication address deletion event to the router 1, and the communication address of the smart speaker is included. The router 1 updates, based on the communication address deletion event, the second trustlist stored by the router 1, and deletes the communication address of the smart speaker in the second trustlist stored by the router 1. The router 1 synchronizes an updated second trustlist to each router in the local area network. Optionally, the communication address deletion event further includes the first trustlist stored in the smart speaker. The router 1 receives the communication address deletion event, and updates, based on the first trustlist in the communication address deletion event, the second trustlist stored in the router 1. The router 1 synchronizes an updated second trustlist to each router in the local area network. For example, the router 1 receives the first trustlist sent by the smart speaker, and obtains a first trustlist stored by another device that belongs to a same multicast group as the smart speaker on each network segment of the local area network. A communication address that is in the first trustlist sent by the smart speaker and that does not belong to the first trustlist of another device is deleted from the second trustlist stored in the router 1. In this way, after the smart speaker is restored to factory settings, the router no longer forwards a message of the smart speaker in the multicast mode and a message of a corresponding control device on which DLNA delivery security confirmation is performed on the smart speaker.

Generally, the user may install an App of the smart speaker on the electronic device, and use the App to control the smart speaker, set a parameter of the smart speaker, and the like. The mobile phone is used as an example, the user may set a "Hide" function of the smart speaker in an App on the mobile phone.

In some examples, the "Hide" function of the smart speaker is disabled by default. When the "Hide" function is disabled, the control device can discover and control the smart speaker. For example, the control device discovers and controls the smart speaker based on the procedure shown in FIG. 4, FIG. 5A, or FIG. 5B. When the "Hide" function of the smart speaker is enabled, a device on which DLNA delivery security confirmation is performed on the smart speaker are allowed (including a device connecting to a same router or different routers with the smart speaker) to discover the smart speaker.

Figure 6A:
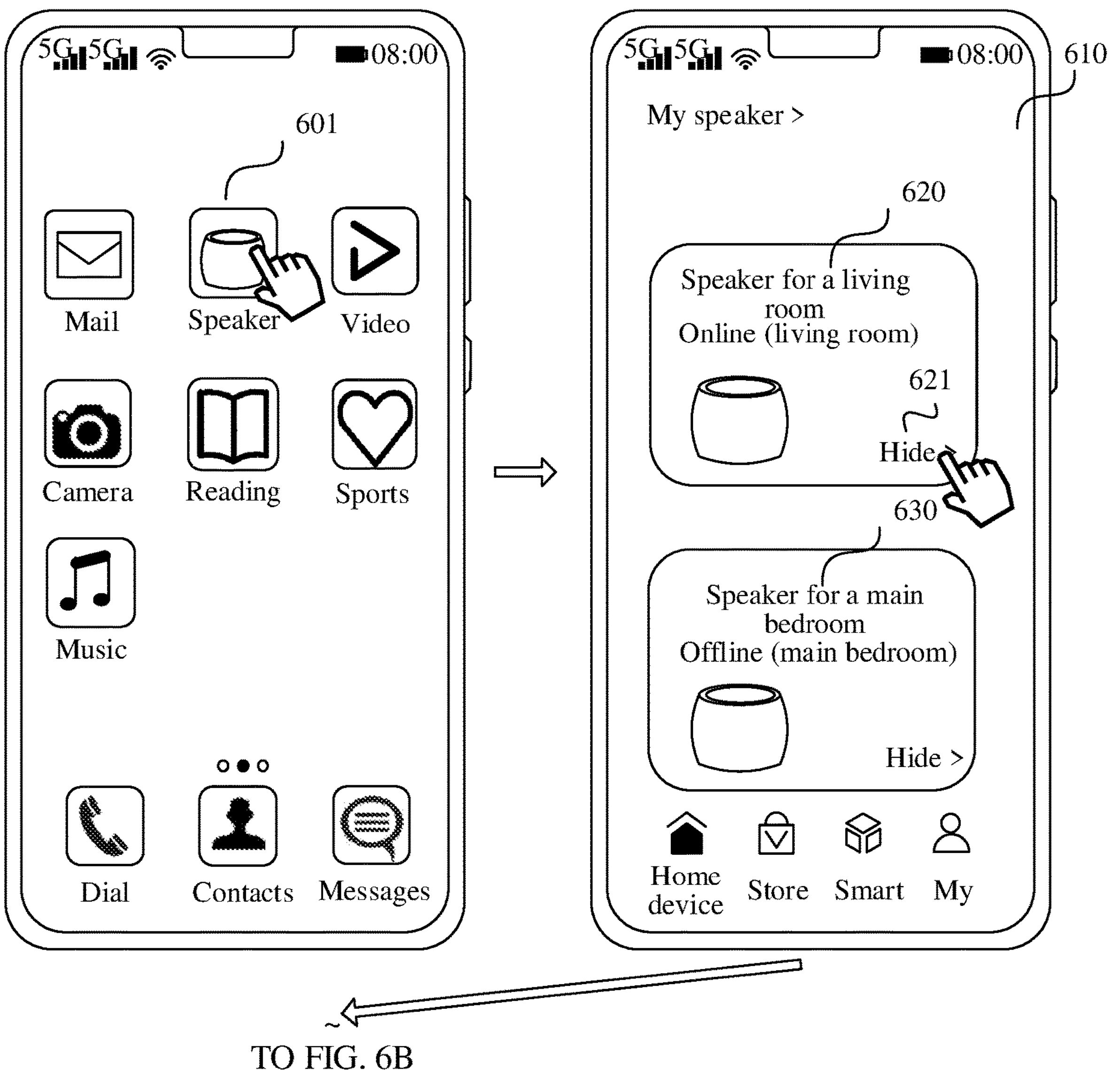
FIG. 6A and FIG. 6B are a schematic diagram of a graphical user interface of a "Hide" function in a method for discovering and controlling an electronic device across network segments according to an embodiment of this application.
Figure 6B:
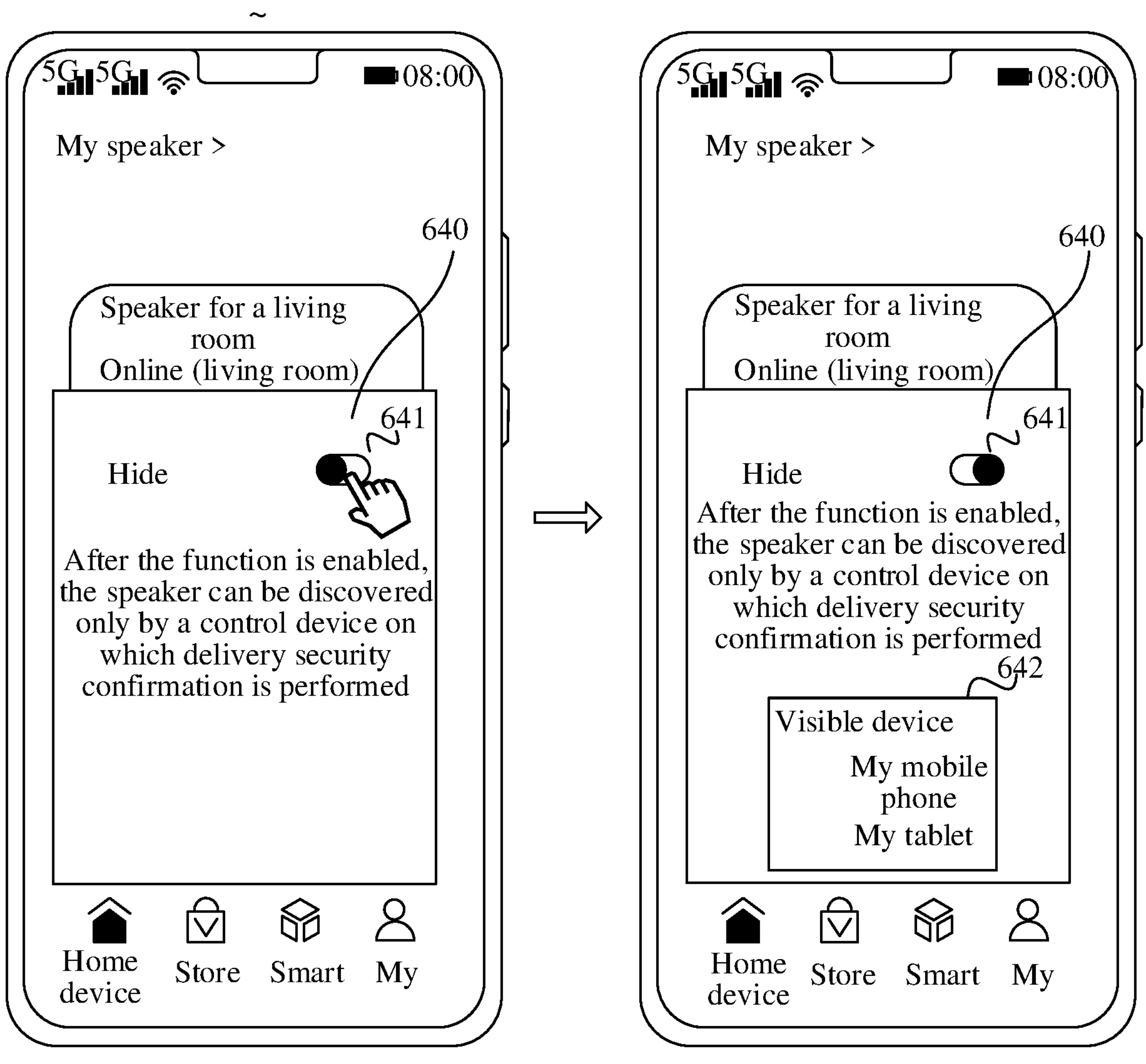

For example, as shown in FIG. 6A, the desktop of the mobile phone includes a "Speaker" icon 601. The mobile phone receives a tapping operation performed by the user on the "Speaker" icon 601, and in response to the tapping operation performed by the user on the "Speaker" icon 601, the mobile phone displays a "My speaker" interface 610. The "My speaker" interface 610 includes a "Speaker for a living room" page 620, a "Speaker for a main bedroom" page 630, and the like. The "Speaker for a living room" page 620 is used to set a smart speaker 1 located in the living room, and the "Speaker for a main bedroom" page 630 is used to set a smart speaker 2 located in the bedroom 1. The "Speaker for a living room" page 620 includes a "Hide" option 621. The mobile phone may receive a tap operation performed by the user on the "Hide" option 621, and in response to the tap operation performed by the user on the "Hide" option 621, the mobile phone displays a "Hide" page 640. The "Hide" page 640 includes a "Hide" selection button 641. The "Hide" selection button 641 is used to enable or disable the "Hide" function. Optionally, the "Hide" page 640 further includes prompt information "After the function is enabled, the speaker can be discovered only by a control device on which delivery security confirmation is performed", and this is used to describe a function of enabling the "Hide" function. For example, the "Hide" selection button 641 is off by default. The user may choose to enable or disable the "Hide" function by tapping the "Hide" selection button 641. Optionally, after the "Hide" function is enabled, the mobile phone may further display a "Visible device" page 642. The "Visible device" on the smart speaker, that is, display a device that the smart speaker allows to be discovered and controlled after the "Hide" function is enabled. In this way, after the "Hide" function of the smart speaker is enabled, a device that can still discover and control the smart speaker is displayed to the user.

Figure 7:
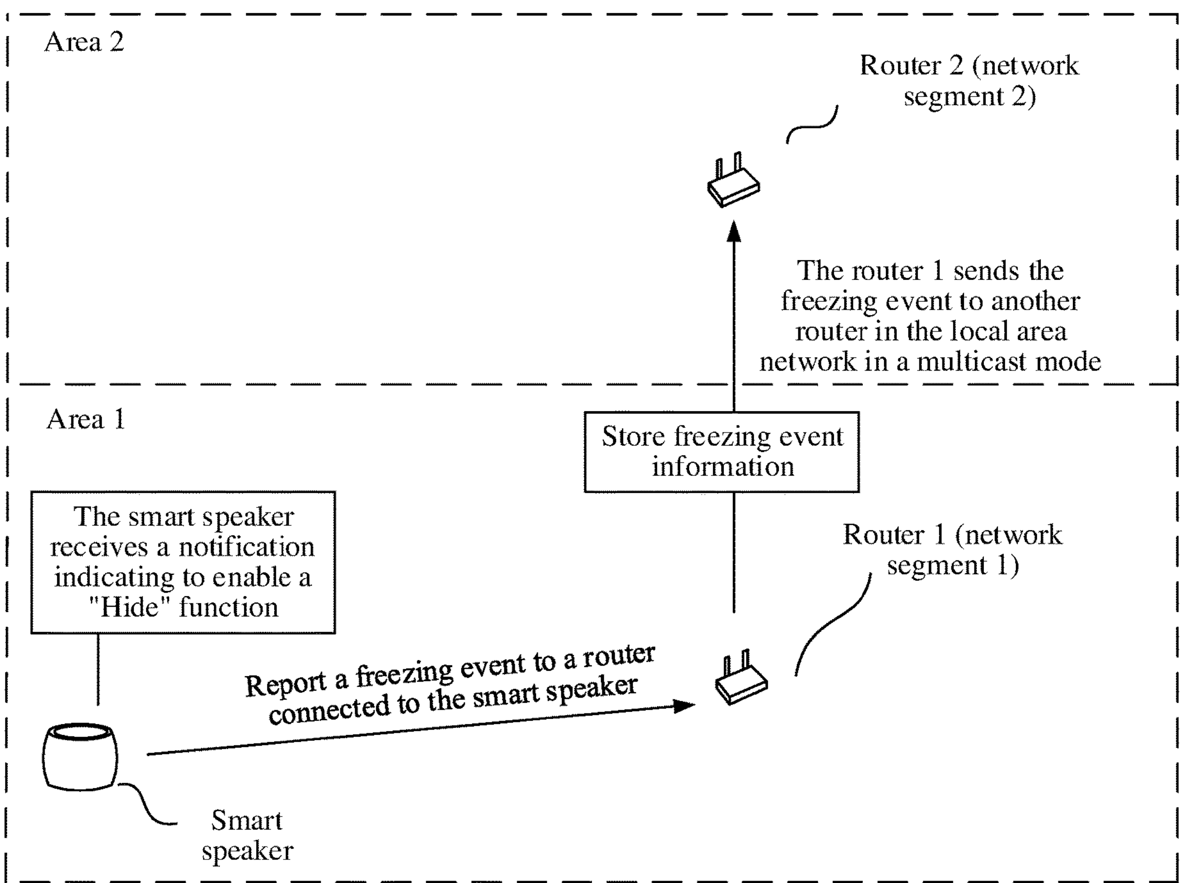
FIG. 7 is a schematic flowchart of a DLNA delivery method according to an embodiment of this application.

In an example, as shown in FIG. 7, the mobile phone receives an operation of enabling the "Hide" function of the smart speaker by the user, and notifies the smart speaker to enable the "Hide" function. After receiving a notification indicating to enable the "Hide" function, the smart speaker reports a freezing event to a router (the router 1) connected to the smart speaker. In an example, the freezing event includes a freezing device identifier, for example, the communication address of the smart speaker. After receiving the freezing event sent by the smart speaker, the router 1 stores freezing event information. The freezing event information includes a freezing device identifier (for example, the communication address of the smart speaker). The router 1 sends a freezing event to another router in the local area network in the multicast mode. Each router in the local area network receives the freezing event, and synchronizes freezing event information stored in each router.

The router supports to perform SSDP multicast forwarding on a message sent by the smart speaker to a device corresponding to a communication address included in the first trustlist. The router does not forward a message sent by the smart speaker to a device corresponding to a communication address that is not included in the first trustlist. For a message sent by a device that belongs to the device corresponding to the communication address included in the first trustlist of the smart speaker, the router performs SSDP multicast forwarding. For a message sent by a device that does not belong to the device corresponding to the communication address included in the first trustlist of the smart speaker, the router does not perform SSDP multicast forwarding. In this way, after the "Hide" function of the smart speaker is enabled, for a device located on a different network segment from the smart speaker, if the device is performed DLNA delivery security confirmation on the smart speaker, the smart speaker can be discovered and controlled. If the device is not performed DLNA delivery security confirmation on the smart speaker, the smart speaker cannot be discovered and controlled.

When the "Hide" function of the smart speaker is enabled, the smart speaker may process a multicast message obtained through listening and a message sent by a device (a device on which DLNA delivery security confirmation is performed on the smart speaker) corresponding to the communication address included in the first trustlist stored by the smart speaker; and the smart speaker does not process a message sent by a device (a device on which DLNA delivery security confirmation is not performed on the smart speaker) that does not belongs to the device corresponding to the communication address included in the first trustlist stored by the smart speaker. In an implementation, after receiving a unicast message (for example, a control message sent by the mobile phone) sent by the electronic device, the smart speaker determines whether the stored first trustlist includes a communication address of the electronic device. If it is determined that the stored first trustlist includes the communication address of the electronic device, a corresponding action (for example, playing or pausing) is performed based on the received unicast message. If it is determined that the stored first trustlist does not include a communication address of the electronic device, the received unicast message is ignored. In this way, a device on which DLNA delivery security confirmation is not performed on the smart speaker is not allowed to control the smart speaker on a same network segment.

In an example, a first mobile phone (the first phone is not performed DLNA security confirmation on the smart speaker) and the smart speaker are located in a same area (the first mobile phone and the smart speaker connect to a same router). The first mobile phone discovers the smart speaker according to the SSDP protocol. The user performs DLNA delivery to the smart speaker by using the first mobile phone, and the first mobile phone sends a DLNA delivery request to the smart speaker. The smart speaker detects that the "Hide" function is enabled, determines that a communication address of the first mobile phone does not belong to the first trustlist, and does not process the DLNA delivery request, that is, does not perform DLNA delivery. For example, the smart speaker silently prompts the user that the smart speaker has enabled the "Hide" function (for example, the smart speaker blinks a specific light effect), and DLNA delivery is not supported. In this way, for a device on which DLNA delivery security confirmation is not performed on the smart speaker, when the device and the smart speaker are located on a same network segment, the device can discover the smart speaker but cannot perform DLNA delivery to the smart speaker.

In another example, a second mobile phone (the second phone is performed DLNA security confirmation on the smart speaker) and the smart speaker are located in a same area (the second mobile phone and the smart speaker connect to a same router). The second mobile phone discovers the smart speaker according to the SSDP protocol. The user performs DLNA delivery to the smart speaker by using the second mobile phone, and the second mobile phone sends a DLNA delivery request to the smart speaker. The smart speaker detects that the "Hide" function is enabled, determines that a communication address of the second mobile phone belongs to the first trustlist, executes a corresponding action based on the DLNA delivery request, and sends a response message to the mobile phone. In this way, for a device on which DLNA delivery security confirmation is performed on the smart speaker, when the device and the smart speaker are located on a same network segment, the device can discover and control the smart speaker.

In another example, a first mobile phone (the first phone is not performed DLNA security confirmation on the smart speaker) and the smart speaker are located in different areas. For example, the first mobile phone connects to the wireless network provided by the router 2, and the smart speaker connects to the wireless network provided by the router 1. The first mobile phone sends the discovery message to the SSDP port of the specified multicast address, and the router 2 determines that a communication address of the first mobile phone does not belong to the second trustlist, and does not forward the discovery message. The first mobile phone and the smart speaker cannot discover each other. In this way, for a device on which DLNA delivery security confirmation is not performed on the smart speaker, when the device and the smart speaker are located on different network segments, the device cannot discover and control the smart speaker.

In another example, a second mobile phone (the second phone is performed DLNA security confirmation on the smart speaker) and the smart speaker are located in different areas. For example, the second mobile phone connects to the wireless network provided by the router 2, and the smart speaker connects to the wireless network provided by the router 1. The second mobile phone sends the discovery message to the SSDP port of the specified multicast address, and the router 2 determines that a communication address of the second mobile phone belongs to the second trustlist, and forwards the discovery message in the multicast mode between the routers (for example, the router 1 and the router 2) in the local area network. In this way, the second phone and the smart speaker discover each other. For a device on which DLNA delivery security confirmation is performed on the smart speaker, when the device and the smart speaker are located on different network segments, the device can discover and control the smart speaker.

Figure 8A:
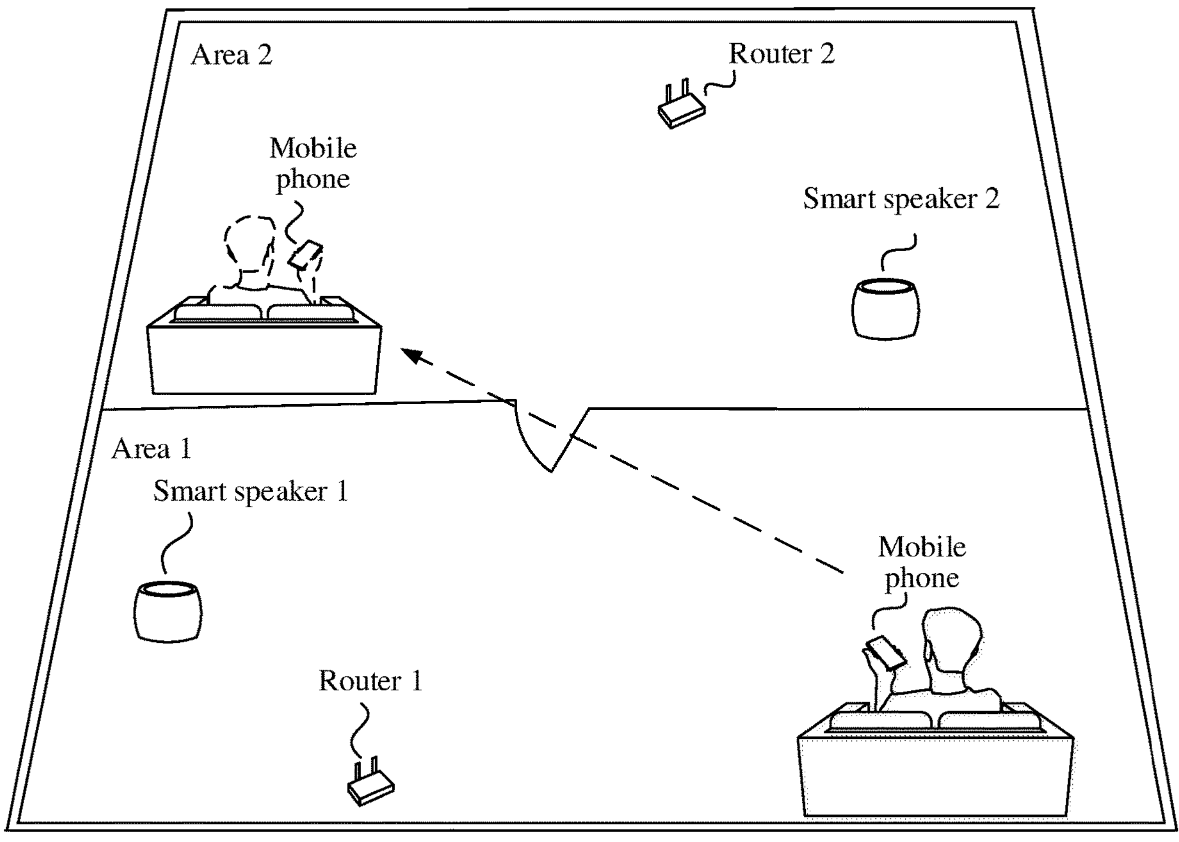
FIG. 8A is a schematic diagram of a scenario of a DLNA delivery method according to an embodiment of this application.

An embodiment of this application further provides a DLNA delivery method. For example, as shown in FIG. 8A, a house of a user includes an area 1 (a living room) and an area 2 (a bedroom 1). The living room and the bedroom 1 are separately configured with a router, and the two routers intelligently network, to provide a wireless network in the house. The router in the living room is a router 1, the router 1 provides the wireless network in the living room, and a Wi-Fi network segment is a network segment 1. The router in the bedroom 1 is a router 2, the router 2 provides the wireless network in the bedroom 1, and a Wi-Fi network segment is a network segment 2. A smart speaker 1 is placed in the living room and connects to the router 1. A smart speaker 2 is placed in the bedroom 1 and connects to the router 2.

Figure 8B:
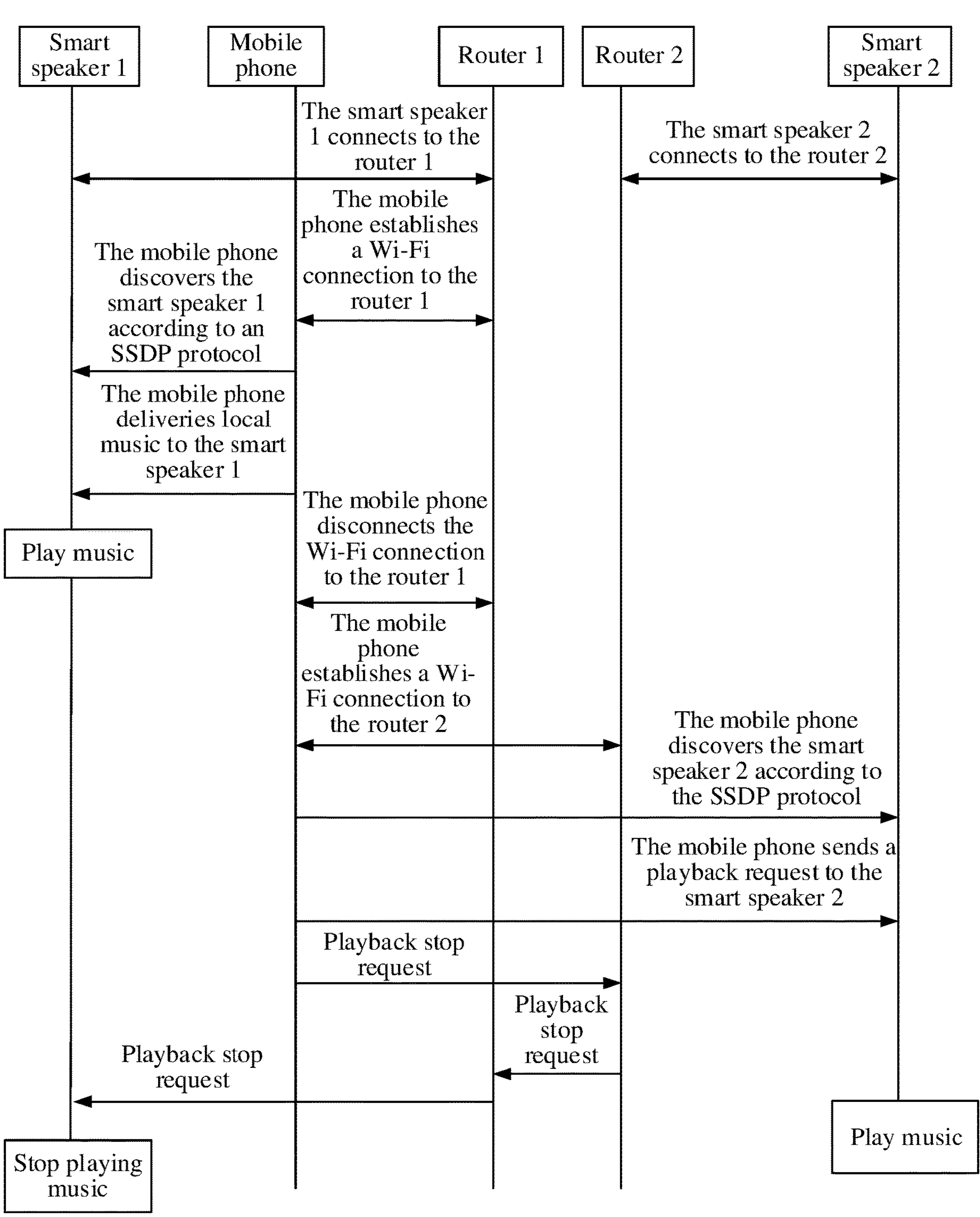
FIG. 8B is a schematic flowchart of a DLNA delivery method according to an embodiment of this application.

As shown in FIG. 8B, the user enters the living room with a mobile phone, and the mobile phone establishes a Wi-Fi connection to the router 1. The mobile phone discovers the smart speaker 1 according to the SSDP protocol and performs DLNA delivery to the smart speaker 1. For example, the mobile phone delivers local music to the smart speaker 1. In a process in which the smart speaker 1 plays music, the user leaves the living room with the mobile phone and enters the bedroom 1. The mobile phone disconnects a Wi-Fi connection to the router 1 and establishes a Wi-Fi connection to the router 2. The mobile phone discovers the smart speaker 2 according to the SSDP protocol. When detecting that the router connected to the mobile phone is changed from the router 1 to the router 2, the mobile phone sends a playback stop request to the smart speaker 1, and sends a playback request to the smart speaker 2. For example, the mobile phone sends the playback stop request to the smart speaker 1 through forwarding performed by the router 2 and the router 1, and the smart speaker 1 stops playing music if the smart speaker receives the playback stop request. In an implementation, the playback request sent by the mobile phone to the smart speaker 2 includes first indication information, and the first indication information indicates a start location of playing music (for example, starting to play from the $10^{th}$ second of the music). In this way, if a user moves in the house with the mobile phone, and the user enters a room, a smart speaker in the room plays music. In some examples, each smart speaker is switched, to play music, and the played music is continuous. This brings immersive experience to the user and improves user experience.

It may be understood that, to implement the foregoing functions, the foregoing electronic devices include a corresponding hardware structure and/or a software module for performing each function. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the foregoing electronic devices may be divided into functional modules based on the foregoing method examples. For example, each functional module may be obtained through division for a corresponding function, or two or more functions may be integrated into one processing module. The integrated module may be implemented in a form of hardware, or may be implemented in a form of a software functional module. It should be noted that module division in embodiments of this application is an example, and is merely logical function division. In actual implementation, there may be another division manner.

Figure 9:
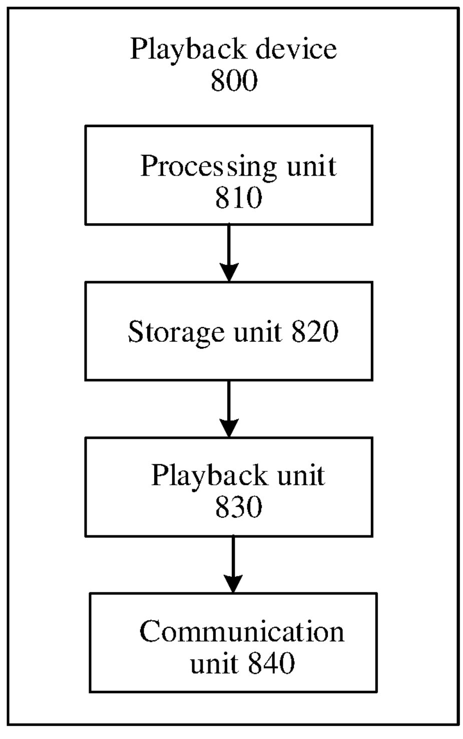
FIG. 9 is a schematic diagram of structural composition of an electronic device according to an embodiment of this application.

In an example, FIG. 9 is a possible schematic diagram of a structure of a playback device in the foregoing embodiments. A playback device 800 includes: a processing unit 810, a storage unit 820, a playback unit 830, and a communication unit 840.

The processing unit 810 is configured to control and manage an action of the playback device 800. For example, the processing unit may be configured to perform steps such as performing DLNA delivery security confirmation, controlling the playback device 800 and a control device to discover each other, and controlling to perform DLNA delivery. The storage unit 820 is configured to store program code and data of the playback device 800. For example, the storage unit is configured to store a first trustlist. The playback unit 830 is configured to play DLNA delivery content. The communication unit 840 is configured to implement that the playback device 800 communicates with another apparatus. For example, the communication unit is configured to implement that the playback device 800 establishes a connection to a routing device, and is configured to implement that the playback device 800 and the control device discover each other.

Certainly, units and modules in the playback device 800 include but are not limited to the processing unit 810, the storage unit 820, the playback unit 830, and the communication unit 840. For example, the playback device 800 may further include a power unit or the like. The power unit is configured to supply power to the playback device 800.

The processing unit 810 may be a processor or a controller, for example, may be a central processing unit (CPU), a digital signal processor (DSP), an application-specific integrated circuit (ASIC), a field programmable gate array (FPGA), or another programmable logic device, a transistor logic device, a hardware component, or any combination thereof. The storage unit 820 may be a memory. The playback unit 830 may include an audio unit (a loudspeaker), a display unit (a display), and the like. The communication unit 840 may be a transceiver, a transceiver circuit, or the like.

For example, the processing unit 810 is a processor (the processor 210 as shown in FIG. 3), the storage unit 820 may be a memory (the internal memory 221 as shown in FIG. 3), the playback unit 830 may include an audio module (the audio module 260 as shown in FIG. 3), a loudspeaker (the loudspeaker 260A as shown in FIG. 3), or a display (the display 270 as shown in FIG. 3), and the communication unit 840 may be referred to as a communication interface, and includes a wireless communication module (the wireless communication module 250 as shown in FIG. 3). The playback device 800 provided in this embodiment of this application may be the playback device 200 shown in FIG. 3. The processor, the memory, the loudspeaker, the display, the communication interface, and the like may be connected together, for example, connected by using a bus.

An embodiment of this application further provides a computer-readable storage medium. The computer-readable storage medium stores computer program code. When a processor executes the computer program code, an electronic device performs the method in the foregoing embodiments.

An embodiment of this application further provides a computer program product. When the computer program product runs on a computer, the computer is enabled to perform the method in the foregoing embodiments.

The playback device 800, the computer-readable storage medium, or the computer program product provided in this embodiment of this application are all configured to perform the corresponding methods provided above. Therefore, for the beneficial effects that can be achieved by the playback device 800, the computer-readable storage medium, or the computer program product, refer to the beneficial effects in the corresponding methods provided above, and details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In several embodiments provided in this application, it should be understood that the disclosed apparatus and method may be implemented in other manners. For example, the described apparatus embodiments are merely examples. For example, the module or unit division is merely logical function division and there may be another division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic, a mechanical, or another form.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes: any medium that can store program code, such as a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A cross-network-segment discovery method applicable to a network, the method comprising:

a first routing device located in a first area;

a second routing device located in a second area;

a first electronic device located in the first area; and a second electronic device located in the first area, wherein:

the first electronic device and the second electronic device are connected to the first routing device, the first routing device and the second routing device are connected to a same local area network, and the first routing device and the second routing device provide different network segments, the discovery method comprising:

sending, by the first electronic device, a digital living network alliance (DLNA) delivery request message to the second electronic device, wherein the DLNA delivery request message comprises at least one URL and an identifier of the second electronic device;

displaying or playing, by the second electronic device, content corresponding to at least one of the URL after receiving the DLNA delivery request message;

detecting, by the first electronic device, movement of the first electronic device from the first area to the second area;

disconnecting, by the first electronic device, from the first routing device and connecting to the second routing device;

sending, by the first electronic device, a first request message to the second routing device, wherein the first request message comprises a fixed multicast address;

forwarding, by the second routing device, the first request message to the first routing device;

sending, by the first routing device, the first request message in a multicast mode within a range of a first multicast address;

sending, by the second electronic device, a first response message to the first electronic device through the first routing device and the second routing device in sequence after receiving the first request message; and receiving, by the first electronic device, the first response message and discovering the second electronic device.

2. The method of claim 1, wherein accessing content corresponding to the URL comprises:

displaying or playing, by the second electronic device, content associated with the URL.

3. The method of claim 2, wherein the DLNA delivery request message further comprises an identifier of the first electronic device, the method further comprising:

sending, by the second electronic device, a first record message to the first routing device, wherein the first record message comprises the identifier of the first electronic device and the identifier of the second electronic device.

4. The method of claim 3, the method further comprising:

storing, by the first routing device, the identifier of the first electronic device and the identifier of the second electronic device on the first routing device.

5. The method of claim 4, the method further comprising:

sending, by the first routing device, the first record message to the second routing device.

6. The method of claim 5, the method further comprising:

storing, by the second routing device, the identifier of the first electronic device and the identifier of the second electronic device on the second routing device.

7. The method of claim 6, wherein the first request message further comprises the identifier of the first electronic device; and the forwarding, by the second routing device, the first request message to the first routing device after receiving the first request message comprises:

forwarding the first request message to the first routing device after the identifier of the first electronic device is matched to an identifier of an electronic device stored on the second routing device.

8. The method of claim 6, wherein the first request message further comprises the identifier of the first electronic device; and the sending, by the first routing device, the first request message in a multicast mode within a range of a first multicast address comprises:

sending the first request message after the identifier of the first electronic device is matched to an identifier of an electronic device stored on the first routing device.

9. A cross-network-segment discovery method applied to a first routing device, wherein:

the first routing device, a first electronic device, and a second electronic device are located in a first area;

a second routing device located in a second area;

the first electronic device and the second electronic device connect to the first routing device;

the first routing device and the second routing device connect to a same local area network;

the first routing device and the second routing device provide different network segments; the method comprising:

storing, by the first routing device, an identifier of the first electronic device;

sending, by the first routing device, the identifier of the first electronic device to the second routing device, wherein after the first electronic device is moved from the first area to the second area, the method further comprises:

disconnecting, by the first routing device, from the first electronic device; and sending, by the first routing device, a first request message in a multicast mode within a range of a first multicast address after receiving the first request message from the second routing device and after an identifier of the first electronic device is matched to an identifier of an electronic device stored on the first routing device, wherein the first request message comprises a fixed multicast address and the identifier of the first electronic device.

10. A first routing device, wherein:

the first routing device, a first electronic device, and a second electronic device are located in a first area;

a second routing device located in a second area;

the first electronic device and the second electronic device connect to the first routing device;

the first routing device and the second routing device connect to a same local area network; and the first routing device and the second routing device provide different network segments, the first routing device comprising:

a processor; and a memory coupled to the processor and storing computer program code including instructions that, executed by the processor, cause the first routing device to perform operations including:

storing, by the first routing device, an identifier of the first electronic device;

sending, by the first routing device, the identifier of the first electronic device to the second routing device, wherein after the first electronic device is moved from the first area to the second area, the method further comprises:

disconnecting from the first electronic device; and sending a first request message in a multicast mode within a range of a first multicast address after receiving the first request message from the second routing device and after an identifier of the first electronic device matches an identifier of an electronic device stored on the first routing device, wherein the first request message comprises a fixed multicast address and the identifier of the first electronic device.

11. A non-transitory computer-readable storage medium including computer program code stored thereon including instructions that, when run on a first routing device, cause the first routing device to perform operations including:

storing, by the first routing device, an identifier of a first electronic device;

sending, by the first routing device, the identifier of the first electronic device to a second routing device, wherein after the first electronic device is moved from a first area to a second area, the operations further include:

disconnecting from the first electronic device; and sending a first request message in a multicast mode within a range of a first multicast address after receiving the first request message from the second routing device and after an identifier of the first electronic device matches an identifier of an electronic device stored on the first routing device, the first request message comprising a fixed multicast address and the identifier of the first electronic device;

wherein:

the first routing device, the first electronic device, and a second electronic device are located in the first area;

the first electronic device and the second electronic device connect to the first routing device;

the first routing device and the second routing device connect to a same local area network; and the first routing device and the second routing device provide different network segments.

* * * * *